(12) United States Patent
Dorner et al.

(10) Patent No.: US 9,916,613 B1
(45) Date of Patent: Mar. 13, 2018

(54) AUTOMATIC COLOR PALETTE BASED RECOMMENDATIONS FOR AFFILIATED COLORS

(71) Applicant: Amazon Technologies, Inc., Reno, NV (US)

(72) Inventors: Charles Shearer Dorner, Seattle, WA (US); Jenny Ann Blackburn, Seattle, WA (US); Robert Yuji Haitani, Seattle, WA (US); Eva Manolis, Bellevue, WA (US); Timothy Andrew Ong, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 880 days.

(21) Appl. No.: 14/316,467

(22) Filed: Jun. 26, 2014

(51) Int. Cl.
*G06Q 30/06* (2012.01)

(52) U.S. Cl.
CPC ..... *G06Q 30/0631* (2013.01); *G06Q 30/0621* (2013.01); *G06Q 30/0643* (2013.01)

(58) Field of Classification Search
CPC combination set(s) only.
See application file for complete search history.

(56) References Cited

U.S. PATENT DOCUMENTS

| | | | |
|---|---|---|---|
| 5,508,718 A * | 4/1996 | Haikin | G06T 11/001 345/601 |
| 5,544,284 A | 8/1996 | Allebach et al. | |
| 5,684,895 A | 11/1997 | Harrington | |
| 5,822,503 A | 10/1998 | Gass, Jr. et al. | |
| 6,014,125 A | 1/2000 | Herbert | |
| 6,081,276 A | 6/2000 | Delp | |
| 6,124,945 A | 9/2000 | Ishihara et al. | |

(Continued)

FOREIGN PATENT DOCUMENTS

| | | |
|---|---|---|
| EP | 3 161 677 | 5/2017 |
| EP | 3 161 770 | 5/2017 |

(Continued)

OTHER PUBLICATIONS

"Exalead CloudView Semantics Whitepaper," Doc. No. EN.140.001.0-V1.2; Oct. 2010, pp. 1-30. Retrieved from http:www.3ds.com/fileadmin/PRODUCTS/EXALEAD/Documents/whitepapers/Exalead-CloudView-Semantics-EN.pdf on Aug. 24, 2015.

(Continued)

*Primary Examiner* — Tsung-Yin Tsai
(74) *Attorney, Agent, or Firm* — Knobbe Martens Olson & Bear LLP

(57) ABSTRACT

Systems and methods are provided for generating color-related item recommendations using color palette information. A request may be received from a user for a color-related item recommendation. The request may include an input image and one or more item attributes. Based at least in part on an analysis of the input image to identify affiliated colors to the input image and the one or more item attributes, one or more items corresponding to the affiliated colors and the one or more item attributes are identified. Where there is more than one identified item, a ranking for the identified plurality of items may be generated. Item recommendations comprising at least a portion of the identified plurality of items in accordance with the generated ranking may be provided for presentation on a user device.

21 Claims, 11 Drawing Sheets

(56) References Cited

U.S. PATENT DOCUMENTS

| | | |
|---|---|---|
| 6,385,336 B1 | 5/2002 | Jin |
| 6,513,014 B1 | 1/2003 | Walker et al. |
| 6,577,759 B1 | 6/2003 | Caron et al. |
| 7,136,074 B2 | 11/2006 | Hussie |
| 7,444,658 B1 | 10/2008 | Matz et al. |
| 7,801,893 B2 | 9/2010 | Gulli' et al. |
| 7,961,938 B1 | 6/2011 | Remedios |
| 8,393,002 B1 | 3/2013 | Kamvar et al. |
| 8,416,255 B1* | 4/2013 | Gilra ............... G01J 3/526 |
| | | 345/593 |
| 8,553,045 B2 | 10/2013 | Skaff et al. |
| 8,576,241 B1 | 11/2013 | Kanter et al. |
| 8,634,640 B2 | 1/2014 | Bhatti et al. |
| 8,762,419 B2 | 6/2014 | Moroney |
| 8,867,798 B2 | 10/2014 | Shuster |
| 9,047,804 B1 | 6/2015 | Moroney et al. |
| 9,135,719 B1 | 9/2015 | Dorner et al. |
| 9,177,391 B1 | 11/2015 | Dorner et al. |
| 9,245,350 B1 | 1/2016 | Dorner et al. |
| 9,311,889 B1 | 4/2016 | Dorner et al. |
| 9,396,560 B2 | 7/2016 | Dorner et al. |
| 9,401,032 B1 | 7/2016 | Dorner et al. |
| 9,514,543 B2 | 12/2016 | Dorner et al. |
| 9,524,563 B2* | 12/2016 | Sayre, III ............ G06T 7/408 |
| 9,542,704 B2 | 1/2017 | Dorner et al. |
| 9,552,656 B2 | 1/2017 | Dorner et al. |
| 9,633,448 B1 | 4/2017 | Dorner |
| 9,652,868 B2 | 5/2017 | Gunningham et al. |
| 9,659,032 B1 | 5/2017 | Dorner et al. |
| 9,679,532 B2 | 6/2017 | Dorner et al. |
| 9,697,573 B1 | 7/2017 | Haitani et al. |
| 9,727,983 B2 | 8/2017 | Dorner et al. |
| 9,741,137 B2 | 8/2017 | Dorner et al. |
| 2001/0028464 A1 | 10/2001 | Aritomi |
| 2002/0080153 A1* | 6/2002 | Zhao ............... H04N 1/644 |
| | | 715/700 |
| 2003/0004938 A1* | 1/2003 | Lawder ......... G06F 17/30333 |
| 2003/0011612 A1 | 1/2003 | Luo et al. |
| 2003/0083850 A1 | 5/2003 | Schmidt et al. |
| 2003/0142124 A1 | 7/2003 | Takata et al. |
| 2003/0146925 A1 | 8/2003 | Zhao et al. |
| 2004/0090453 A1 | 5/2004 | Jasinschi et al. |
| 2005/0122427 A1 | 6/2005 | Hougui et al. |
| 2005/0149411 A1 | 7/2005 | Colwell |
| 2005/0222978 A1 | 10/2005 | Drory et al. |
| 2006/0023082 A1 | 2/2006 | Higuchi |
| 2006/0066629 A1 | 3/2006 | Norlander et al. |
| 2006/0248081 A1 | 11/2006 | Lamy |
| 2006/0250669 A1 | 11/2006 | Beretta |
| 2006/0268120 A1 | 11/2006 | Funakura et al. |
| 2007/0100786 A1 | 5/2007 | Moroney |
| 2008/0003547 A1 | 1/2008 | Woolfe et al. |
| 2008/0025629 A1 | 1/2008 | Obrador et al. |
| 2008/0025647 A1 | 1/2008 | Obrador et al. |
| 2008/0046410 A1 | 2/2008 | Lieb |
| 2008/0046424 A1 | 2/2008 | Horton |
| 2008/0069442 A1 | 3/2008 | Itoh |
| 2008/0294600 A1 | 11/2008 | Clark et al. |
| 2008/0301582 A1 | 12/2008 | Gluck |
| 2008/0317336 A1 | 12/2008 | Mojsilovic |
| 2009/0027414 A1 | 1/2009 | Vaughn |
| 2009/0041345 A1 | 2/2009 | Tirumalareddy et al. |
| 2009/0055758 A1 | 2/2009 | Sim et al. |
| 2009/0157595 A1 | 6/2009 | Gubitz |
| 2009/0227375 A1 | 9/2009 | Weisman et al. |
| 2009/0248626 A1 | 10/2009 | Miller |
| 2009/0259567 A1 | 10/2009 | Watts |
| 2009/0281925 A1 | 11/2009 | Winter et al. |
| 2010/0027834 A1 | 2/2010 | Spitzig et al. |
| 2010/0053201 A1 | 3/2010 | Klassen et al. |
| 2010/0082654 A1 | 4/2010 | Zhang et al. |
| 2010/0110455 A1 | 5/2010 | Woolfe |
| 2010/0158412 A1 | 6/2010 | Wang et al. |
| 2011/0135195 A1* | 6/2011 | Marchesotti ......... G06K 9/4652 |
| | | 382/165 |
| 2011/0205231 A1 | 8/2011 | Hartley et al. |
| 2011/0305386 A1 | 12/2011 | Wang et al. |
| 2011/0319160 A1 | 12/2011 | Arn et al. |
| 2012/0036163 A1 | 2/2012 | Myers et al. |
| 2012/0045121 A1* | 2/2012 | Youngman ......... G06Q 30/0601 |
| | | 382/162 |
| 2012/0075329 A1 | 3/2012 | Skaff et al. |
| 2012/0099784 A1 | 4/2012 | Marchesotti et al. |
| 2012/0099788 A1 | 4/2012 | Bhatti et al. |
| 2012/0109944 A1 | 5/2012 | Hao |
| 2012/0154420 A1 | 6/2012 | Calandrino et al. |
| 2012/0163710 A1 | 6/2012 | Skaff et al. |
| 2012/0206477 A1 | 8/2012 | Yanagisawa |
| 2013/0013991 A1 | 1/2013 | Evans |
| 2013/0033603 A1 | 2/2013 | Suzuki et al. |
| 2013/0050238 A1 | 2/2013 | Bergou et al. |
| 2013/0148741 A1 | 6/2013 | Steinberg et al. |
| 2013/0226659 A1 | 8/2013 | Patel et al. |
| 2013/0227636 A1 | 8/2013 | Bettini et al. |
| 2013/0235398 A1 | 9/2013 | Bhatti et al. |
| 2013/0266217 A1 | 10/2013 | Gershon et al. |
| 2013/0300761 A1 | 11/2013 | Ahmed |
| 2014/0037200 A1 | 2/2014 | Phillips et al. |
| 2014/0044349 A1 | 2/2014 | Wang et al. |
| 2014/0049799 A1 | 2/2014 | Li et al. |
| 2014/0052584 A1 | 2/2014 | Gershon et al. |
| 2014/0067014 A1 | 3/2014 | Kaula et al. |
| 2014/0089781 A1* | 3/2014 | Hoguet ............... G06F 17/211 |
| | | 715/234 |
| 2014/0153821 A1 | 6/2014 | Masuko et al. |
| 2014/0177952 A1 | 6/2014 | Masuko |
| 2014/0189476 A1 | 7/2014 | Berthelot et al. |
| 2014/0270498 A1 | 9/2014 | Chester et al. |
| 2014/0300775 A1 | 10/2014 | Fan et al. |
| 2014/0304661 A1 | 10/2014 | Topakas et al. |
| 2014/0334722 A1 | 11/2014 | Bloore et al. |
| 2014/0355874 A1 | 12/2014 | Sakamaki et al. |
| 2015/0235110 A1 | 8/2015 | Curtis et al. |
| 2015/0235389 A1 | 8/2015 | Miller et al. |
| 2015/0262549 A1 | 9/2015 | Moroney |
| 2015/0269747 A1 | 9/2015 | Hogan et al. |
| 2015/0324392 A1 | 11/2015 | Becker et al. |
| 2015/0324394 A1 | 11/2015 | Becker et al. |
| 2015/0332479 A1 | 11/2015 | Gershon et al. |
| 2015/0356128 A1 | 12/2015 | Nishimura |
| 2015/0378999 A1 | 12/2015 | Dorner et al. |
| 2015/0379000 A1 | 12/2015 | Haitani et al. |
| 2015/0379001 A1 | 12/2015 | Gunningham et al. |
| 2015/0379002 A1 | 12/2015 | Dorner et al. |
| 2015/0379003 A1 | 12/2015 | Dorner et al. |
| 2015/0379004 A1 | 12/2015 | Sayre et al. |
| 2015/0379005 A1 | 12/2015 | Dorner et al. |
| 2015/0379006 A1 | 12/2015 | Dorner et al. |
| 2015/0379071 A1 | 12/2015 | Dorner et al. |
| 2015/0379608 A1 | 12/2015 | Dorner et al. |
| 2015/0379731 A1 | 12/2015 | Dorner et al. |
| 2015/0379732 A1 | 12/2015 | Sayre et al. |
| 2015/0379733 A1 | 12/2015 | Dorner et al. |
| 2015/0379738 A1 | 12/2015 | Gunningham et al. |
| 2015/0379739 A1 | 12/2015 | Dorner et al. |
| 2015/0379743 A1 | 12/2015 | Dorner et al. |
| 2015/0379959 A1 | 12/2015 | Dorner et al. |
| 2016/0005188 A1 | 1/2016 | Dorner et al. |
| 2016/0005201 A1 | 1/2016 | Kunkel et al. |
| 2016/0104303 A1 | 4/2016 | Dorner et al. |
| 2016/0335784 A1 | 11/2016 | Dorner et al. |
| 2017/0084053 A1 | 3/2017 | Dorner et al. |
| 2017/0098314 A1 | 4/2017 | Sayre et al. |

FOREIGN PATENT DOCUMENTS

| | | |
|---|---|---|
| JP | 2012-221317 A | 11/2012 |
| WO | WO 2014/070914 A1 | 5/2014 |
| WO | WO 2015/145766 A1 | 10/2015 |
| WO | WO 2015/200502 A1 | 12/2015 |
| WO | WO 2015/200505 A1 | 12/2015 |
| WO | WO 2015/200509 A1 | 12/2015 |

(56) References Cited

FOREIGN PATENT DOCUMENTS

WO  WO 2015/200515 A1  12/2015
WO  WO 2015/200523 A1  12/2015

OTHER PUBLICATIONS

Beretta, Giordano B., et al.; "Harmonious colors: from alchemy to science," Color Imaging XVII: Displaying Processing, Hardcopy, and Applications, SPIE vol. 8292, No. 1, pp. 1-7; Bellingham, WA; Jan. 22, 2012.

Csurka, Gabriela, et al.; "Learning moods and emotions from color combinations," Proceedings of the Seventh Indian Conference on Computer Vision, Graphics and Image Processing, pp. 298-305; New York; Dec. 12, 2010.

Dorner, C.S., Automatic Image-Based Recommendations Using a Color Palette, U.S. Appl. No. 14/316,268, filed Jun. 26, 2014.

Global Color Survey, http://www.colorcom.com/global-color-survey, Feb. 1, 2001, accessed Sep. 11, 2015.

Heer, Jeffrey, et al.; "Color naming models for color selection, image editing and palette design," Proceedings of the 2012 ACM Annual Conference on Human Factors in Computing Systems, pp. 1007-1016; New York; May 5, 2012.

Lawder, Jonathan, "The Application of Space-filling Curves to the Storage and Retrieval of Multi-dimensional Data," PhD thesis; Sections 4.3.5.1, p. 68, and 6.5, pp. 121-130; Jan. 1, 2000.

Tremeau et al., "A vector quantization algorithm based on the nearest neighbor of the furthest color," Proceedings of International Conference on Image Processing, vol. 3, pp. 682-685, Oct. 26-29, 1997.

Tropf, H. et al., "Multidimensional range search in dynamically balanced trees," Angewandte Informatik (Applied Informatics), pp. 71-77; Braunschweig, Germany; Feb. 1, 1981.

Zhu, Haiping, et al., "Deep into Color Names: Matching Color Descriptions by Their Fuzzy Semantics," Artificial Intelligence: Methodology, Systems, and Applications Lecture Notes in Computer Science; Lecture Notes in Artificial Intelligence, pp. 138-149; Jan. 1, 2006.

International Search Report and Written Opinion in PCT/US2015/037469 dated Oct. 1, 2015.

International Search Report and Written Opinion in PCT/US2015/037456 dated Sep. 9, 2015.

International Search Report and Written Opinion in PCT/US2015/037494 dated Sep. 14, 2015.

International Search Report and Written Opinion in PCT/US2015/037465 dated Oct. 27, 2015.

International Search Report and Written Opinion in PCT/US2015/037481 dated Sep. 14, 2015.

Das et al., "Indexing flowers by color names using domain knowledge-driven segmentation," Proc. The Fourth IEEE Workshop on Applications of Computer Vision; pp. 94-99; 1998.

Wang et al., "Contextual Dominant Color Name Extraction for Web Image Search," 2012 IEEE International Conference on Multimedia and Expo Workshops (ICMEW), pp. 319-324.

"Color Blind Assistant." iPhone Apps Versions 2.61 and 2.62; Release date Oct. 14-15, 2009; pp. 1-7.

"Color Name & Hue." Wayback Machine Archive; May 16, 2013; pp. 1-17. <http://web.archive.org/web/20130516202647/http://www.color-blindness.com/color-name-hue>.

"HTML Color Picker," Wayback Machine Archive; Feb. 15, 2013; 1 page <http://web.archive.org/web/20130215181242/http://imagecolorpicker.com/>.

"Tin Eye Labs." Wayback Machine Archive; Sep. 20, 2012; pp. 1-3. <http://web.archive.org/web/20120920051712/http://labs.tineye.com/color/>.

Delon, J., et al., Automatic Color Palette, Proceedings of the International Conference on Image Processing, vol. 2, Sep. 11-14, 2005, pp. 706-709.

Nickerson, D., et al., Central Notations for ISCC-NBS Color Names, Journal of the Optical Society of America, vol. 31; pp. 587-591; Sep. 1941.

Das et al, Indexing Flower Patent Images Using Domain Knowledge, IEEE Intelligent Systems, vol. 14, No. 5; 1999; pp. 24-33.

Balasubramanian, Raja, et al.; Sequential Scalar Quantization of Color Images, Journal of Electronic Imaging, vol. 3, No. 1, pp. 45-59; Jan. 1994.

U.S. Appl. No. 14/316,483, entitled Image-Based Color Palette Generation, filed Jun. 26, 2014.

Bell, E., Color Detection: Technology on Heels with Lyst Engineering, dated Feb. 22, 2014, retrieved Apr. 7, 2014, <http://developers.lyst.com/data/images/2014/02/22/color-detection/>.

Luo et al., "Novel color palettization scheme for preserving important colors," Proc. SPIE. 5008. Color Imaging VIII: Processing, Hardcopy, and Applications; Jan. 20, 2003.

Montagne et al., "Adaptive color quantization using the baker's transformation," J. Electronic Imaging 15(2); Apr. 2006.

Periasamy et al., "A Common Palette Creation Algorithm for Multiple Images with Transparency Information," IEEE 2009 Int'l Conf. on Advances in Computing, Control, and Telecommunication Technologies.

Yu et al., "Contextual algorithm for color quantization," J. Electronic Imaging 12(3); Jul. 2003.

* cited by examiner

AUTOMATIC COLOR PALETTE BASED RECOMMENDATIONS FOR AFFILIATED COLORS

BACKGROUND

In many computing-centric commerce models, users are able to efficiently view and purchase a wide variety of items, over computer networks. In many scenarios, a particular network resource, such as a commerce network site, can present items (e.g., goods and/or services) associated with different colors. The items may be depicted in photographs or other images presented via the network site.

BRIEF DESCRIPTION OF THE DRAWINGS

The foregoing aspects and many of the attendant advantages will become more readily appreciated as the same become better understood by reference to the following detailed description, when taken in conjunction with the accompanying drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
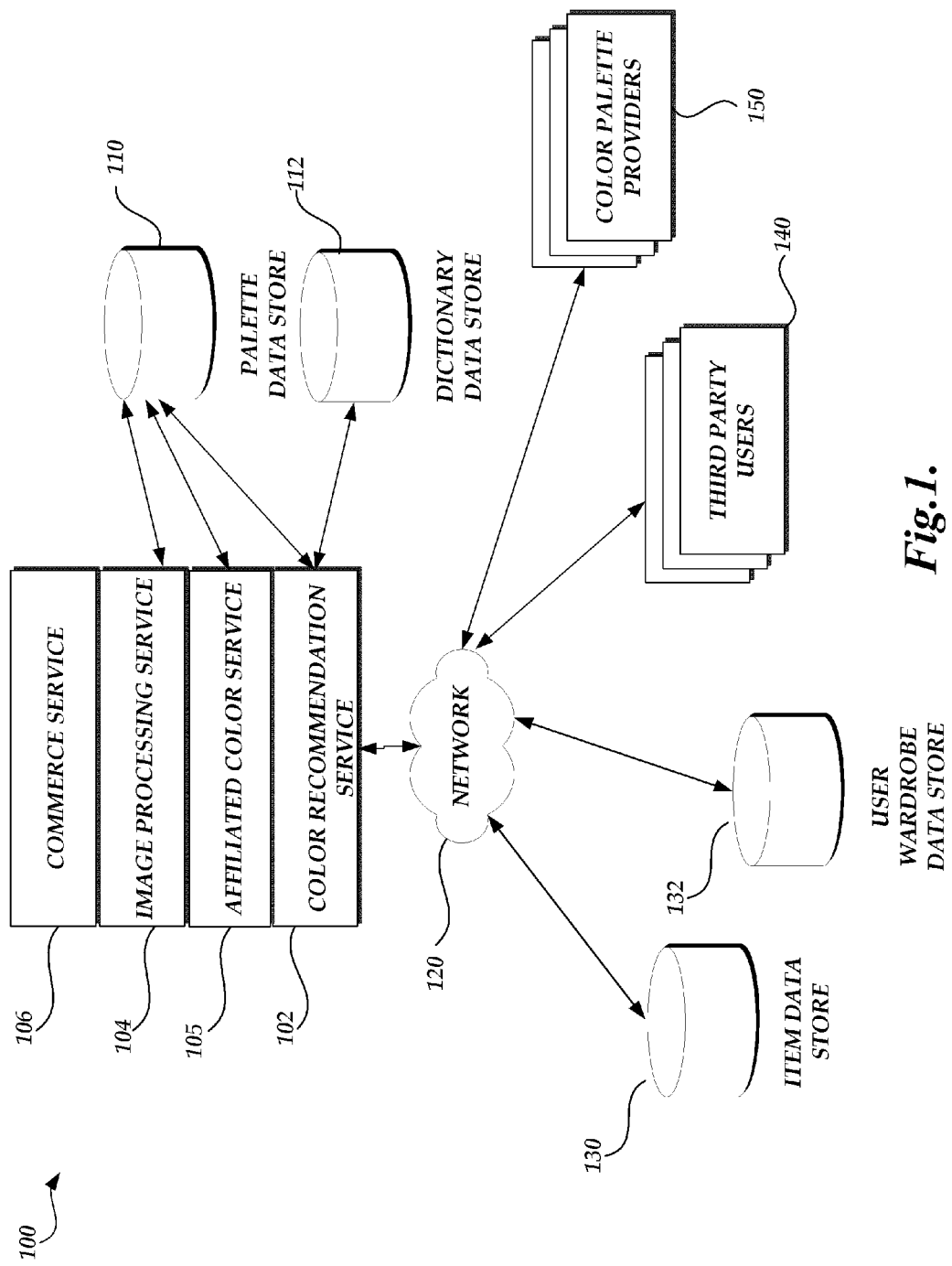
FIG. 1 is a block diagram illustrating an embodiment of an operating environment including an image processing service for color palette generation based on color images, an affiliated color services for identifying affiliated colors, and a color recommendation service.

Generally described, the present disclosure corresponds to methods and systems for providing color-related item recommendations. Often, a user visiting a network site, such as a Website, may wish to locate an item of a specified type and a specified color. In certain instances, users visiting the network site may wish to locate an item having a color that matches or corresponds to the specified color. A color that matches or corresponds to the specified color may, for example, be a color that matches the predominate color in the specified item or includes any one or more of the colors identified in the specified item.

In other instances, users visiting the network site may wish to locate an accessory or other item having a color that coordinates with a specified item, such as an item of clothing, furniture, appliances, housewares, etc. A color that coordinates with the specified item may be a color that does not match the one or more colors corresponding to the specified item, but rather includes a color that is otherwise affiliated with one or more colors corresponding to the specified item. In one embodiment, a user may want to know what colored items of clothing the user already has that would go well with each other as part of an outfit. In other instances, a merchandiser may want to assemble a set of coordinating items from a catalog of items.

One or more of the various uses cases discussed above are addressed by one or more embodiments disclosed herein. Aspects of the present disclosure relate to generating color-related recommendations and more particularly to generating color-related recommendations based at least in part on affiliated colors. Aspects of the present disclosure further relate to utilizing image-derived color palettes, which are collections of representative colors each optionally associated with weight or other metadata, in generating recommendations. Yet further, aspects of the present disclosure leverage one or more data stores of color palettes that have been rated, ranked, and/or voted on by a community of people to indicate which color combinations are preferred by that community. Using an initial color or colors, such as an initial color palette, an ordered list of affiliated colors can be generated where each affiliated color is ranked based at least in part on the popularity of the combination of the initial color or colors with that affiliated color. The color palette can be supplemented by adding an affiliated color to the colors in the palette and then updating the list of affiliated colors to suggest new affiliated colors to add to the updated palette. The resulting color palette can be configured to contain a combination of colors that is visually appealing or preferable because each affiliated color used in generating the supplemented color palette has been determined by the community of people to be an appropriate or preferable color companion to the color or colors already in the palette. As an alternative to adding affiliated colors to the original color palette, the identified affiliated colors can be otherwise associated with the original color palette.

In accordance with an illustrative embodiment, an image processing service obtains a color image depicting one or more items, a design, a scene, or the like, and generates one or more color palettes based on palette generation criteria. The palette generation criteria can be input by a user, an artist, a host of a commerce network site or other network site, a merchandise provider or vendor, or the like. Alternatively, or in addition, the palette generation criteria can be automatically generated by a computing device or system. The palette generation criteria may indicate various preferences, factors, parameters, thresholds, or requirements that facilitate or control a palette generation process.

Illustratively, the palette generation process may include various elements such as image pre-processing, color distribution generation, representative color identification, palette candidate generation, and/or palette determination. For example, the color image can be pre-processed prior to the generation of color distribution or identification of representative colors. The pre-processing can include de-noising, normalization, down sampling, area-marking, or the like. A color distribution can be generated based on color values corresponding to each pixel of a color image. Representative colors can then be identified based on the color distribution. For example, colors that are most distant from one another as measured by certain color distance formula(e) can be identified as representative colors. One or more thresholds can be utilized in the identification of representative colors to facilitate color merging or weighting. The identified representative colors with associated weight or other metadata may constitute a palette candidate corresponding to specific threshold settings as indicated by palette generation criteria. In some embodiments, multiple palette candidates can be generated by changing the threshold settings. A palette may be used as a color fingerprint for a given item, and so may be used to identify the item using color-related search terms. As used herein, the term "item," in addition to having its ordinary meaning, is used interchangeably to refer to an item itself (e.g., a particular product) and to its description or representation in a computer system or electronic catalog. As will be apparent from the context in which it is used, the term is also sometimes used herein to refer only to the item itself or only to its representation in the computer system.

Continuing with the prior example and in accordance with a further illustrative embodiment, each of the one or more generated palettes or individual colors identified in the one or more generated palettes may be supplemented by one or more affiliated colors or otherwise associated with one or more affiliated colors. For example, in some embodiments, a first color can be selected by a program or a user and a plurality of palettes can be identified from a data store of palettes that contain that color (or a sufficiently similar color). From those palettes, a list of affiliated colors can be generated by identifying the other colors in the palettes. For each affiliated color in the list, a weight can be assigned based on the ranking, rating, and/or number of votes the containing palette has received. The list of affiliated colors can be ordered based on the assigned weights. The program or user can select an affiliated color from the ordered or weighted list to add to a custom color palette containing the initial color. When the selected affiliated color is added to the palette (or otherwise associated with the original color), a new list of affiliated colors can be generated based at least in part on the colors in the palette. This allows the program or user to continue to build the color palette (or the associated grouping of affiliated colors).

In other embodiments, two or more colors can be selected by a program or a user and a plurality of palettes can be identified from a data store of palettes that contain one or more of those colors (or sufficiently similar colors). A list of affiliated colors can be generated that includes a weight factor for each color, the weight factor based on the ranking, rating, and/or number of votes the containing palette has received. In certain implementations, the weight factor can be adjusted based on the relative popularity, rating, and/or ranking of the initial two or more colors. This may be accomplished, for example and without limitation, by decreasing the weight of colors affiliated with a relatively popular color and/or increasing the weight of colors affiliated with a relatively unpopular color. From the weighted list of affiliated colors, the program or user can select a color to add to the palette containing the initial two or more colors. When the selected affiliated color is added to the palette (or otherwise associated with the two or more initial colors), a new list of affiliated colors can be generated based at least in part on the two or more initial colors along with the new color added to the palette (or otherwise associated with the two or more initial colors). This allows the program or user to continue to build the color palette (or the associated grouping of affiliated colors).

Overview of an Example Embodiment

FIG. 1 illustrates an embodiment of a color recommendation processing environment 100 that can implement the features described herein in the context of an example color recommendation service 102. In some embodiments, the color recommendation processing environment 100 includes the color recommendation service 102, an image processing service 104, an affiliated color service 105, a commerce service 106, a palette data store 110, a dictionary data store 112, a network 120, an item data store 130, a user wardrobe data store 132, third party users 140, and color palette providers 150. In some embodiments, various components of the recommendation processing environment 100 are communicatively interconnected with one another via the network 120. The recommendation processing environment 100 may include different components, a greater or fewer number of components, and can be structured differently. For example, there can be more than one data store or other computing devices in connection with the color recommendation service 102. As another example, components of the recommendation processing environment 100 may communicate with one another with or without the network 120.

The image processing service 104 can correspond to any system capable of performing the associated processes described herein. The image processing service 104 may be implemented by one or more computing devices. For example, the image processing service 104 may be implemented by computing devices that include one or more processors to execute one or more instructions, memory, and communication devices to transmit and receive data over the network 120. In some embodiments, the image processing service 104 is implemented on one or more backend servers capable of communicating over a network. In other embodiments, the image processing service 104 is implemented by one or more virtual machines in a hosted computing environment (e.g., a "cloud computing environment"). The hosted computing environment may include one or more provisioned and released computing resources, which computing resources may include computing, networking or storage devices.

In one aspect, the image processing service 104 can correspond to one or more applications that perform, individually or in combination, the image processing functions described herein, including image pre-processing, color distribution generation, representative color identification, palette candidate generation, palette determination, etc. In another aspect, the image processing service 104 may be configured to store or update palettes at the palette data store 110. In some embodiments, the image processing service 104 is associated with a network or network-based merchandise provider or vendor. The image processing service 104 may access and process images from the item data store 102. In some embodiments, the images are provided by merchandisers or other parties for posting on a network site, for example, on a network page (e.g., a Web page) presenting details regarding a particular item(s) (an "item detail page") and from which consumers can purchase the item. In yet other embodiments, the images are provided by consumers, provided by third party image data stores, or provided by other image sources. In the illustrated embodiment, the image processing service 104 is communicatively connected to the palette data store 110.

The affiliated color service 102 can correspond to any system capable of performing the associated processes described herein. The affiliated color service 102 may be implemented by one or more computing devices. For example, the affiliated color service 102 may be implemented by computing devices that include one or more processors to execute one or more instructions, memory, and communication devices to transmit and receive data over the network 120. In some embodiments, the affiliated color service 102 is implemented on one or more backend servers capable of communicating over a network. In certain embodiments, the affiliated color service 102 is implemented by one or more virtual machines in a hosted computing environment.

In some aspects, the affiliated color service 102 can correspond to one or more applications that perform, individually or in combination, the functions described herein, including determining affiliated colors, assigning weights to affiliated colors, normalizing weights of affiliated colors, clustering or combining colors based on color distances, determining color similarity thresholds, updating affiliated colors based at least in part on updated palettes, etc. In certain aspects, the affiliated color service 102 may be configured to store or update palettes at the palette data store 110, and thus is communicatively connected to the palette data store 110. In some embodiments, the affiliated color service 102 is associated with a network or network-based merchandise provider or vendor.

The color recommendation service 102 can correspond to any system capable of performing the associated processes described herein. The color recommendation service 102 may be implemented by one or more computing devices. For example, the color recommendation service 102 may be implemented by computing devices that include one or more processors to execute one or more instructions, memory, and communication devices to transmit and receive data over the network 120. In some embodiments, the color recommendation service 102 is implemented on one or more backend servers capable of communicating over a network. In other embodiments, the color recommendation service 102 is implemented by one or more virtual machines in a hosted computing environment.

In one aspect, the color recommendation service 102 can correspond to one or more applications that perform, individually or in combination, the recommendation functions described herein, including recommending a color, recommending a color palette, recommending an item of a specified color, recommending items that coordinate with a user specified item, recommending sets of color coordinated items, recommending items of selected colors based on user textual and/or image-based search queries, etc. Recommendations of such colors, palettes and/or items may correspond to matching or affiliated colors, palettes and/or items as will be further described herein. Recommendations may include item category recommendations, brand-related recommendations, price-related recommendations, etc. In another aspect, the color recommendation service 102 may be configured to identify color trends and utilize such trends to provide recommendations. In some embodiments, the color recommendation service 102 is associated with a network or network-based merchandise provider or vendor.

The color recommendation service 102 may be communicatively connected to the palette data store 110 and the dictionary data store 112. The palette data store 110 can generally include any repository, database, or information storage system that can store palette data and associated metadata. The dictionary data store 112 can generally include any repository, database, or information storage system that can store dictionaries, such as dictionaries that may be used to parse queries, identify keywords, or determine coordinating items, as discussed elsewhere herein.

The palette data stored in the palette data store 110 can be collections of colors, including collections of colors generated by a user and/or system based at least in part on human color preferences, optionally with associated weight(s) and date(s) of creation. Palette data can be of various formats, such as lists, vectors, arrays, matrices, etc. Metadata may optionally be associated with individual palettes for purposes of textually indicating the color(s) included in the palette using color name(s) or other identifier(s), and optionally indicating their format, tags, associations, sources, popularity, date(s)/time(s) of creation/editing, geolocation data, last update time, semantics, features, conditions, associated demographics (e.g., geographical region, age, gender, ethnic group, religion, culture, language, dialect, etc. of users that provided input used in creating the palette), or the like. The color palettes may have been ranked or voted on by people to indicate which combinations of colors are more preferable, visually appealing, popular, or the like. Such ranking and/or votes may be stored and may be used to weight color palettes. An example process of generating color palettes is discussed in greater detail below.

Using an initial color or colors, an ordered list of affiliated colors can be generated where a given affiliated color is ranked based at least in part on the popularity of the combination of the initial color or colors with that affiliated color. The color palette can be built by adding an affiliated color to the colors in the palette and then updating the list of affiliated colors to suggest new affiliated colors to add to the updated palette. The resulting color palette can be configured to contain a combination of colors that is visually appealing or preferable because each affiliated color used in generating the color palette has been determined by the community of people to be an appropriate or preferable color companion to the color or colors already in the palette. The palettes generated using the affiliated color process may be used to provide color-related recommendations for colors or colored items that would go well with another color or colored item. Particular color palettes may be associated with a particular community that includes a biased population (e.g., that are related based on geographical region, age, gender, ethnic group, preferences, social network, etc.). This enables providing recommended colors to users that have a known and/or inferred bias that corresponds to a palette of a community associated with such a color palette bias.

In some embodiments, a first color can be selected by a program or a user and a plurality of palettes can be identified from a data store of color palettes containing that color (or a sufficiently similar color). From those palettes, a list of affiliated colors can be generated by identifying the other colors in the palettes. For each affiliated color in the list, a weight can be assigned based on the ranking, rating, and/or number of votes the containing palette has received. The list of affiliated colors can be sorted based on the assigned weights. The program or user can select an affiliated color from the sorted list to add to a custom color palette containing the initial color. When the selected affiliated color is added to the palette, a new list of affiliated colors can be generated based at least in part on the colors in the palette that allows the program or user to continue to build the color palette. For more example details on extracting colors from an image to obtain a color palette, see U.S. patent application Ser. No. 14/316,483, entitled "IMAGE-BASED COLOR PALETTE GENERATION," filed on Jun. 26, 2014, which is incorporated by reference herein in its entirety. For more example details on identifying affiliated colors and/or building an affiliated color palette based at least in part on an input color or palette, such as an input color or palette identified from a reference image, see U.S. patent application Ser. No. 14/316,292, entitled "BUILDING A PALETTE OF COLORS BASED ON HUMAN COLOR PREFERENCES," filed on Jun. 26, 2014, which is incorporated by reference herein in its entirety.

The commerce service 106 may provide an electronic catalog to which third party users 140 may be provided access via respective user devices. For example, the commerce service 106 may provide item detail pages. A given item detail page may include detailed information regarding an item (e.g., an item being offered for sale), such as one or more images, descriptive text, color name(s), a price, weight, size options, reviews of the item by other users or by professional reviewers, alternative similar items, and/or other information. The item detail page may also include controls via which the user can select among various versions of the item (e.g., size, color, etc.), and a purchase control via which the user can initiate purchase of the item (e.g., by adding the item to a shopping cart). The commerce service 106 may also provide third party users 140 with interfaces via which the user can request recommendations and submit queries, such as color-related recommendations and search queries.

While a commerce environment is often used as an example herein, it will be appreciated that the color recommendation service 102, image processing service 104 and/or affiliated color service 105, as disclosed herein, may be used in a variety of environments other than a commerce environment. For example, aspects of the present disclosure, in some embodiments, may be used and/or implemented to efficiently recommend colors, affiliated colors and color palettes to consumers, merchandisers, designers, architects, artists, landscapers, developers, gamers, students, etc. for virtually any purpose. Without limitation, aspects of the present disclosure may be used for efficient generation of color-based recommendations for use in social networking contexts, digital photo albums, digital news articles, artistic works, content generation, design/architectural drawings, etc., just to name a few practical, non-limiting examples.

The network 120 may include any suitable combination of networking hardware and protocols necessary to establish communications within the color recommendation processing environment 100. For example, the network 120 may include private networks such as local area networks (LANs) or wide area networks (WANs) as well as public or private wireless networks, satellite networks, cable networks, cellular networks, or the Internet. In such an embodiment, the network 120 may include hardware (e.g., modems, routers, switches, load balancers, proxy servers, etc.) and software (e.g., protocol stacks, accounting software, firewall/security software, etc.) that establish networking links within the color recommendation processing environment 100. Additionally, the network 120 may implement one of various communication protocols for transmitting data between components of the color recommendation processing environment 100.

The item data store 130 may correspond to or be associated with one or more network sites and systems, such as a commerce network site providing the commerce service 106 and the color recommendation service 102, and/or third party merchandise providers or vendors that may market items via the commerce service 106. The item data store 130 may be associated with any computing device(s) that can facilitate communication with the color recommendation service 102 and the commerce service 106 via the network 120. Such computing devices can generally include servers, desktops, laptops, wireless mobile devices (e.g., smart phones, PDAs, tablets, wearable computing devices, or the like), game platforms or consoles, electronic book readers, television set-top boxes, televisions (e.g., internet TVs), and computerized appliances, to name a few. Further, such computing devices can implement any type of software (such as a browser or a mobile media application) that can facilitate the communications described above.

The item data store 130 may have metadata/keywords that identify and/or describe the respective items. By way of example, the item data 130 may store item records for respective items in one or more electronic catalogs including unique item identifiers, such as Universal Product Codes (UPC), European Article Numbers (EAN), International Standard Book Numbers (ISBN), and/or other identifiers. By way of further example, the item metadata may indicate the item type and/or category, such as "dress" and "clothing," or "blender" and "kitchen appliance." In addition, the item metadata may include text or another identifier (sometimes referred to herein as a "color name") identifying one or more colors of the item or of versions of the item, such as "red," "orange," "blue," etc. The metadata may further include such information as brand. Other data, such as price, may be included as metadata or otherwise made accessible. Still further, a given item record may include one or more images of the item, where the image may be associated with metadata (e.g., identifying items in the image by item type, item category, unique identifier, identifying associated color palettes, etc.). Certain keywords may not identify a color explicitly, but may be suggestive of a color (e.g., "summery," "formal," "wintery," etc.). Item record data may have been provided by an operator of a commerce site, by consumers, merchandisers, vendors, third party data stores, artists, designers, color providers, and/or other sources.

The user wardrobe data store 132 may store images of wardrobe items of users (and associated metadata) in respective user accounts. For example, a user may take images, e.g., photographs and/or videos, of the user's wardrobe (e.g., dresses, shoes, blouses, pants, socks, other items of clothing, handbags, briefcases, earrings, necklaces, other jewelry, other accessories, etc.), and upload the images to the user wardrobe data store 132 (which may be maintained in a hosted computing environment). The user may have manually provided metadata to be stored in association with the images (e.g., color, item type, item category, item identifiers, and/or other identifiers, etc.). Alternatively, or in addition, the color recommendation service 102 or other service may have automatically recognized (via an object identification module) the item(s) and its associated color(s) in a given user image, and stored such information as metadata in association with the given user image.

Third party users 140 may correspond to visitors to a network site (e.g., a commerce network site providing commerce service 106), such as consumers, designers, architects, or the like, and can be associated with any computing device(s) that can facilitate communication with the color recommendation service 102 via the network 120. Such computing devices can generally include wireless mobile devices (e.g., smart phones, PDAs, tablets, wearable computing devices, or the like), desktops, laptops, game platforms or consoles, electronic book readers, television set-top boxes, televisions (e.g., internet TVs), and computerized appliances, to name a few. Further, such computing devices can implement any type of software (such as a browser or a mobile media application) that can facilitate the communications described above.

The color palette providers 150 can create and/or curate color combinations based on the preferences of each provider's community of users. Particular color palette providers 150 may be associated with a particular community that includes a biased population or a population with unique or particular preferences. This may allow for the affiliated color service 105 to retrieve palettes with a known and/or desired bias depending at least in part on the use of the retrieved palettes. This may also allow for the affiliated color service 105 to reduce or remove the bias present in different communities by combining palettes from a plurality of communities of users.

The color palette providers 150 can be associated with any computing device(s) that can facilitate communication with the affiliated color service 105 via the network 120. Such computing devices can generally include network servers, desktops, laptops, wireless mobile devices (e.g., smart phones, PDAs, tablets, wearable computing devices, or the like), game platforms or consoles, electronic book readers, television set-top boxes, televisions (e.g., internet TVs), and computerized appliances, to name a few. Further, such computing devices can implement any type of software (such as a network server) that can facilitate the communications described above.

One skilled in the relevant art will appreciate that the example components and configurations provided in FIG. 1 are illustrative in nature. Accordingly, additional or alternative components and/or configurations, especially regarding the additional components, systems and subsystems for facilitating functions disclosed herein may be utilized.

Figure 2:
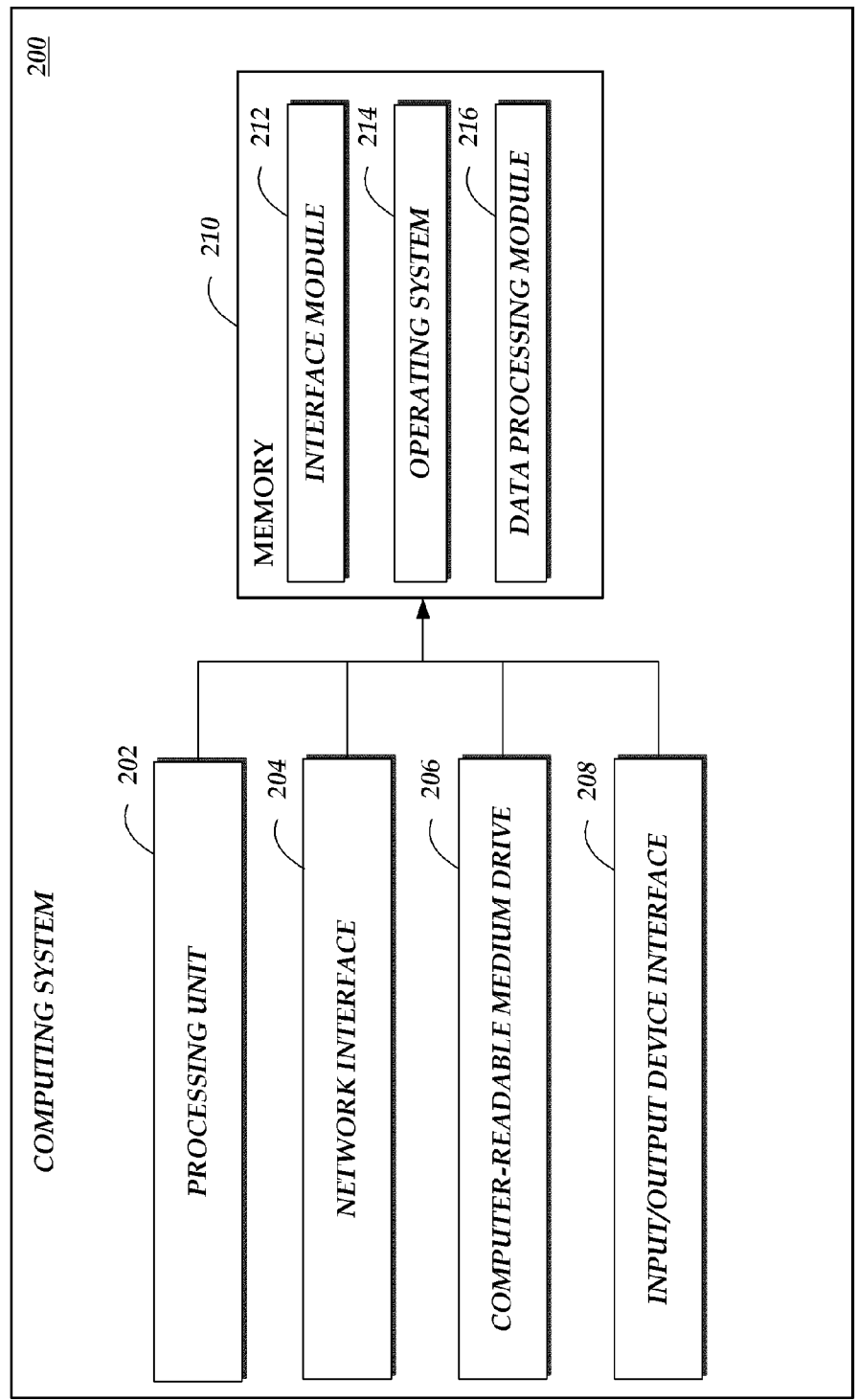
FIG. 2 is a block diagram illustrating an embodiment of example components of a computing system capable of providing the image processing service, color recommendation service and affiliated color service shown in FIG. 1.

FIG. 2 is a block diagram illustrating an embodiment of example components of a computing system 200 providing one or more of a color recommendation service 102, an image processing service 104, an affiliated color service 105, or a commerce service 106, utilized in accordance with the color recommendation processing environment 100 of FIG. 1. The example computing system 200 includes an arrangement of computer hardware and software components that may be used to implement aspects of the present disclosure. Those skilled in the art will appreciate that the example components may include more (or fewer) components than those depicted in FIG. 2. It is not necessary, however, that all of these generally conventional components be shown in order to provide an enabling disclosure.

The computing system 200 may include a processing unit 202, a network interface 204, a non-transitory computer-readable medium drive 206, and an input/output device interface 208, all of which may communicate with one another by way of a communication bus. The network interface 204 may provide the color recommendation service 102, the image processing service 104, the affiliated color service 105, and/or the commerce service 106 with connectivity to one or more networks or computing systems. The processing unit 202 may thus receive information and instructions from other computing devices, systems, or services via a network. The processing unit 202 may also communicate to and from memory 210 and further provide output information via the input/output device interface 208. The input/output device interface 208 may also accept input from various input devices, such as a keyboard, mouse, digital pen, touch screen, etc.

The memory 210 may contain computer program instructions that the processing unit 202 may execute in order to implement one or more embodiments of the present disclosure. The memory 210 generally includes RAM, ROM and/or other persistent or non-transitory computer-readable storage media. The memory 210 may store an operating system 214 that provides computer program instructions for use by the processing unit 202 in the general administration and operation of the color recommendation service 102, the image processing service 104, the affiliated color service 105, and/or the commerce service 106. The memory 210 may further include other information for implementing aspects of the present disclosure.

In an example embodiment, the memory 210 includes an interface module 212. The interface module 212 can be configured to facilitate generating one or more user interfaces through which an item data store 130 or a third party user 140, utilizing a compatible computing device, may send to, or receive from, the color recommendation service 102 recommendations, image data, palette data, instruction data, metadata, etc., or otherwise communicate with the color recommendation service 102. Specifically, the interface module 212 can be configured to facilitate processing functions described herein, including recommending a color, recommending a color palette, recommending an item of a specified color, recommending items that coordinate with a user specified item, recommending an assemblage of coordinating items (e.g., clothing, furniture, appliances, housewares, linen, etc.) in coordinating colors, recommending items of selected colors based on user textual search queries, validating metadata, processing purchase transactions, etc. Recommendations of such colors, palettes and/or items may correspond to matching or affiliated colors, palettes and/or items as will be further described herein.

For example, a third party user 140 may submit a color-related recommendation query or selection and the color recommendation service 102 may access the item data store 130, which may provide data used to satisfy the query or selection, including item images, item colors, item categories, item descriptions, item prices, etc. The third party user may submit queries or selections and receive recommendations via one or more generated user interfaces. The user interface can be implemented as a graphical user interface (GUI), Web-based user interface, computer program, smartphone or tablet program or application, touchscreen, wearable computing device interface, command line interface, gesture, voice, or text interface, etc., or any combination thereof.

In addition, the memory 210 may include a data processing module 216 that may be executed by the processing unit 202. In an example embodiment, the data processing module 216 implements aspects of the present disclosure. For example, the data processing module 216 can be configured to process user queries, instructions, item data from the item data store 130, palette data from the palette data store 110, or metadata to generate color-related recommendations.

It should be noted that the image processing service 104, color recommendation service 102, affiliated color service 105 and commerce service 106 may be implemented by some or all of the components present in the computing system 200 as discussed herein with respect to FIG. 2. In addition, the computing system 200 may include additional components not present in FIG. 2. The modules or components described above may also include additional modules or be implemented by computing devices that may not be depicted in FIG. 1 or 2. For example, although the interface module 212 and the data processing module 216 are identified in FIG. 2 as single modules, one skilled in the relevant art will appreciate that each of the modules may be implemented by two or more modules and in a distributed manner. As another example, the computing system 200 and its components can be implemented by network servers, application servers, network servers, combinations of the same, or the like, configured to facilitate data transmission to and from item data store 130, third party users 140, or other image sources, via network 120. Accordingly, the depictions of the modules are illustrative in nature.

Several example routines will now be described with reference to the figures. It is understood that more than one of the routines or portions thereof may be utilized to generate recommendations in response to a given user query, selection, or other input.

Figure 3:
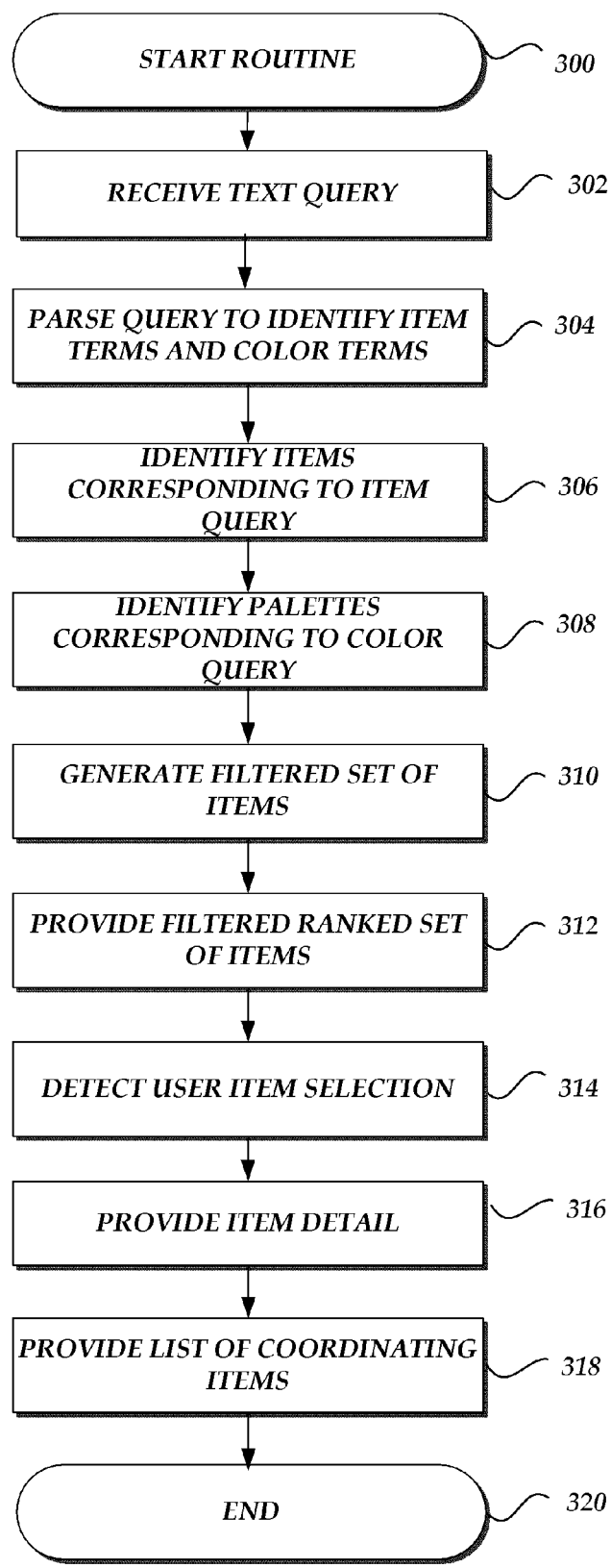
FIG. 3 is a flow diagram illustrating an embodiment of a routine implemented by the color recommendation service to provide recommendations in response to a color name query.

Example Recommendation Process to Generate Color-Related Recommendations in Response to a Text Query Including a Color FIG. 3 illustrates a flow diagram of an example routine performed by the color recommendation service 102 for generating a color-related recommendation at least partly in response to a text-based color name query (where the text query may comprise user-entered text or a selection of text by the user from a menu or otherwise). The color recommendation service 102 begins the routine at a block 300. At block 302 a text-based color name query is received by the color recommendation service 102 from a user via a user device. The text-based color name query specifies a color (e.g., red, blue, orange, etc.) and another item attribute, such as an item type (e.g., dress, blender, couch, or other specific item type) or category (e.g., clothing, appliance, furniture, etc.). The query may also include other terms or filters (e.g., entered as text, selected from a menu, or otherwise provided), such as a price range, desired brands, etc., where the user is looking for recommendations of items corresponding to such terms or filters. In some embodiments, the query may also include an indication that a user would, additionally or alternatively, like to identify items that "go with" or are otherwise associated with an originally identified item. For example, a user may want to identify "red dresses" and items that would "go with" red dresses. Such an additional request for coordinating items may be included in the original query or be provided by a user separately. Alternatively, as will be further described below, the color recommendation service 102 may automatically recommend coordinating items based at least in part on a color or colors identified in the original query.

At block 304, the color recommendation service 102 may parse the query to identify one or more terms that correspond to color and one or more other item attributes, such as an item type and/or category. For example, if the query is "red dress," the color recommendation service 102 may use a dictionary, such as dictionary data store 112, to determine that the term "red" is a color and that the term "dress" is an item type.

At block 306, the color recommendation service 102 may access the item data store 130, which may correspond to an electronic catalog of items, to identify items corresponding to the item attribute term(s). Continuing with the prior example, the identified terms correspond to an item type or category. For example, item records in the item data store 130 may have tags or other metadata/keywords that identify and/or describe the respective items. By way of example, the item data store 130 may store item records for respective items in one or more electronic catalogs including item identifiers and/or other identifiers. By way of further example, the item metadata may indicate the item type and/or category, such as "dress" and "clothing," or "blender" and "kitchen appliance."

In addition, the item metadata may include text or other metadata identifying one or more colors of the item or of versions of the item, such as the color names "red," "orange," "blue," etc. This color metadata may be provided by a variety of sources, such as merchandisers, vendors or others offering the item for presentation. In addition or alternatively, the color metadata may be determined dynamically, or have been previously determined and stored in association with the item as a result of generating a color palette based at least in part on an evaluation of an image associated with the item, the image being further metadata optionally stored in the item data store 130 as associated with the item. For example, the color palette of an identified item having a corresponding image may be determined in substantially real time (e.g., less than 1 second, less than 10 seconds, etc.) using a palette generation routine, such as that discussed herein with respect to FIG. 7 and elsewhere. Then, color names or other color identifiers associated with colors in the color palette may be compared to the color identified by a user in the query. As a result, in some embodiments, items with an associated image having a color that is considered to match the query color can also be identified, whether or not the item has other color metadata provided by a different source, such as a merchandiser or vendor.

The metadata may further include such information as brand. Other data, such as price, may be included as metadata or otherwise accessed. Still further, and as referenced above, a given item record may include one or more images of the item. Item record data may have been provided by an operator of a commerce network site, consumers, third party databases, and/or other sources.

The color recommendation service 102 may compare the query with item metadata or other data to identify items that correspond to the query. The color recommendation service 102 may store a temporary record of the matching items (e.g., by storing a list of corresponding item identifiers). In some embodiments, the color recommendation service 102 may rank the matching items in accordance with the closeness of the match to the query to provide an item relevancy ranking. Optionally, in addition, a user's preferences may be used in ranking matching items. By way of example, the user's preferences may be determined based on the user's purchase or browse history (which may indicate the colors of items purchased or browsed by the user), items already in the user's wardrobe (e.g., as may be determined from the user wardrobe database 132), or preferences explicitly provided by the user via a preference form or otherwise. In addition or alternatively, preferences of other users or groups of users (whether selected by the user or dynamically determined by the color recommendation service 102) may be used in ranking matching items. For example, if a user "follows" or is otherwise associated with a particular fashion expert (e.g., via a social networking site), the expert's preferences may be identified and then used to rank matching items.

In an embodiment where the color recommendation service 102 has yet to consider the identified color(s) in the query and thus has only produced the identified items at block 306 as a result of analyzing the non-color attribute information in the query, the color recommendation service 102, at block 308, identifies one or more color palettes that correspond to the identified color(s) included in the query. For example, the color recommendation service 102 may compare the identified color or colors in the query with metadata (e.g., color names) associated with palettes to identify matching or relevant palettes. The identified palettes may be ranked in accordance with a determination as to how closely a given palette corresponds to the color in the query. For example, palettes may have an assigned weight indicating which is the most dominant color (where a color may or may not be a shade of a color), the second most dominant color, and so on. Optionally, only palettes within a certain range of the color in the query or only a specified maximum number of palettes will be identified (e.g., the 10 closest palettes). Other factors may be taken into account in weighting palettes. For example, attitudes and perceptions of colors, and what colors coordinate with what colors, may change over time based at least in part on one or more of gender, geographic region, ethnic group, age, etc. Thus, the palette weighting may be based at least in part on one or more of the palette date, the user's gender, geographic region, ethnic group, age, palette popularity trends, etc.

At block 310, the color recommendation service 102 filters the matching items to filter out items whose color(s) do not sufficiently match the color in the query, thus generating a filtered set of items responsive to the query. For example, the color recommendation service 102 may determine from metadata associated with the matched items whether they sufficiently match or correspond to the palettes identified at block 308. Optionally, the color recommendation service 102 may rank the filtered list according to the ranking of matching items performed at block 306. As yet another option, the color recommendation service 102 may rank the filtered list according to the ranking of closeness of the item color to the color query. As yet a further option, some combination of the ranking of matching items performed at block 306 and a ranking based on the closeness of the item color to the color query may be used to generate a further relevancy ranking of items.

In some embodiments, it will be appreciated that the processes performed by the color recommendation service 102 at blocks 308 and 310 may be considered as integral with or sub-processes of the identification of items corresponding to the item query at block 306. Accordingly, at block 306, the comparison of the query with item metadata or other data to identify items that correspond to the query may additionally include any one or more of the processes described at blocks 308 and 310. Even further, the comparison and filtering functions described in reference to blocks 306, 308, and 310 may be performed in a variety of orders in order to generate identified items responsive to the query.

At block 312, the identified set of items from block 306, or the filtered set or the ranked filtered list from block 310, is provided for display on the user device (e.g., via a browser installed on the user device, via a dedicated application such as a mobile device app, or otherwise) as recommended items based at least in part on the user's query. The provided set or list of items may be in the form of only images of the matching items, where the images may be retrieved from the item data store 130. The provided set or list of items may be in the form of only text identifying and/or describing the matching items, where the text may be retrieved from the item data store 130. The provided set or list of items may be in the form of both images of the matching items and corresponding text retrieved from the item data store 130. Optionally, controls may be provided to the user for use in indicating that a larger or a smaller number of matching items are to be presented. In response, the color recommendation service 102 may accordingly modify the number of items presented to the user. For example, if the user indicates that fewer items are to be presented to the user, the color recommendation service 102 may present the higher ranked items and not present a number of lower ranked items that had previously been presented.

At block 314, a determination is made as to whether the user has selected an item in the list of items. If the user has selected an item, an item detail page is provided, at block 316, for display on the user device. The item detail page may include detailed information regarding the item, such as one or more images, descriptive text, color name(s), a price, weight, size options, reviews of the item by other users or by professional reviewers, alternative similar items, and/or other information. The item detail page may also include controls via which the user can select among various versions of the item (e.g., size, color, etc.), and a purchase control via which the user can initiate purchase of the item. A control may also be provided via which the user can cause the list of matching items to be again presented to the user.

Optionally, and as will be further described below, the color recommendation service 102 may utilize metadata associated with the item selected by the user to identify similar and/or coordinating items to the user. For example, the color recommendation service 102 may utilize color information associated with the selected item (e.g., associated with the image of the selected item), the item type information, and/or the item categorization information to identify related and/or coordinating items. For example, if the user selected a dress having a palette with a deep shade of red as the primary color, the color recommendation service 102 may, at block 318, identify and present items having a similar palette with deep red as a primary color and/or having a coordinating color palette (an affiliated color palette) different than the primary color of the item. By way of further example, the color recommendation service 102 may identify item accessories (e.g., a scarf, earrings, handbag, etc.) whose color(s) coordinate with the selected dress. The color recommendation service 102 may further select a coordinating item or filter affiliated color item candidates by applying heuristics based on item taxonomy. Optionally, the color recommendation service 102 may identify item accessories or coordinating items in response to a user query (e.g., where the user provides or selects an additional item type or item category query). The identification of similar items and/or coordinating items based on a user selection of an item image (or of an item with an associated image) is discussed in greater detail below with reference to FIG. 4.

Figure 8:
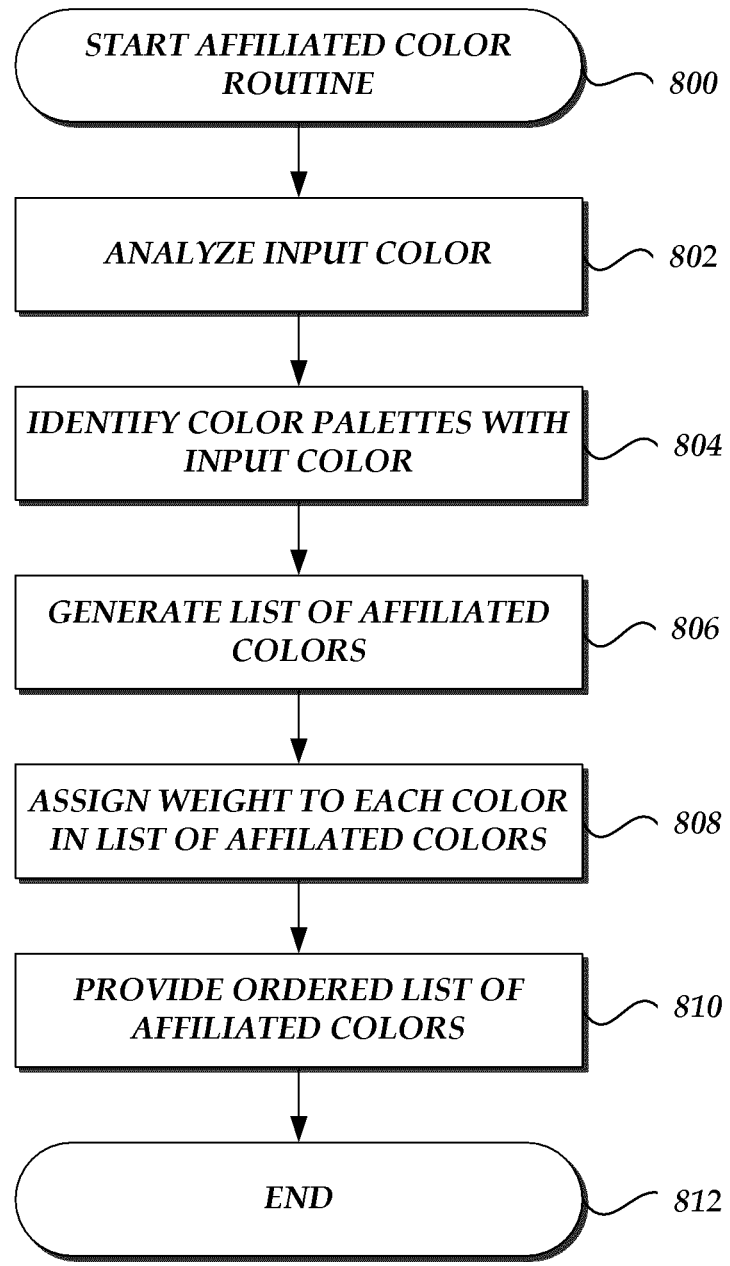
FIG. 8 is a flow diagram illustrating an embodiment of a routine implemented by the affiliated color service for generating an ordered list of affiliated colors.

By way of further example, a user may want to build an outfit based on the color blue. The user may submit a query "blue outfit." The color recommendation service 102 may parse the query and determine that "blue" is a color and "outfit" is an assemblage of clothing items, optionally including accessories. Based on the queried color, the color recommendation service 102 can determine, from the palette data store 110, an ordered list of affiliated colors (e.g., which have been determined by a community of users, through an algorithm, or otherwise to go well with the color in the query). Alternatively, one or more color palettes including affiliated colors may be determined based at least in part on the one or more input colors identified in the original query. In some embodiments, such affiliated color palettes may be dynamically determined. As will be described further below, FIG. 8 illustrates a flow diagram of an example routine for generating a weighted or ordered list of affiliated colors. For more details on generating a weighted or ordered list of affiliated colors or generating a color palette using affiliated colors, see U.S. patent application Ser. No. 14/316,292, entitled "BUILDING A PALETTE OF COLORS BASED ON HUMAN COLOR PREFERENCES," filed on Jun. 26, 2014, which is incorporated by reference herein in its entirety. Continuing with the prior example, the color recommendation service 102 may then identify clothing items having the queried color and affiliated colors, and assemble one or more outfits accordingly. Items in a given assembled outfit may be presented to the user as a set to indicate that the items in the set are part of the same recommended outfit.

As noted above, in some embodiments, coordinating items having one or more colors affiliated with the one or more input colors may be determined and provided to a user after selection of an item responsive to the original query. However, as also noted above, in some embodiments, the original query may also include an indication that a user would, additionally or alternatively, like to identify items that "go with" or are otherwise associated with an originally identified item. For example, a user may want to identify "red dresses" and items that would "go with" red dresses. Such an additional request for coordinating items may be included in the original query or be provided by a user separately. Accordingly, in such embodiments, the color recommendation service 102 would not need to wait for user selection of an item at block 314. Alternatively, the color recommendation service 102 may automatically recommend coordinating items based at least in part on a color or colors identified in the original query without requiring a specific request for coordinating items from a user. As yet another alternative, the original query may only be for items that "go with" or are otherwise associated with an originally identified item. For example, a user may already own a red dress and may thus initiate a query for items in general; or specific items or types or categories of items, such as shoes, hats, accessories or the like, that "go with" red dresses. In such an embodiment, the color recommendation service 102 may perform the processes described at blocks 302-316, with the exception that instead of determining and/or analyzing a matching color or color palettes, an affiliated color or color palettes based at least in part on the one or more input colors are determined and/or analyzed to provide a set of responsive items to the query. As set forth above, one example routine for generating affiliated palettes is provided in reference to FIG. 8. The color recommendation service 102 ends the routine at block 320.

Figure 4:
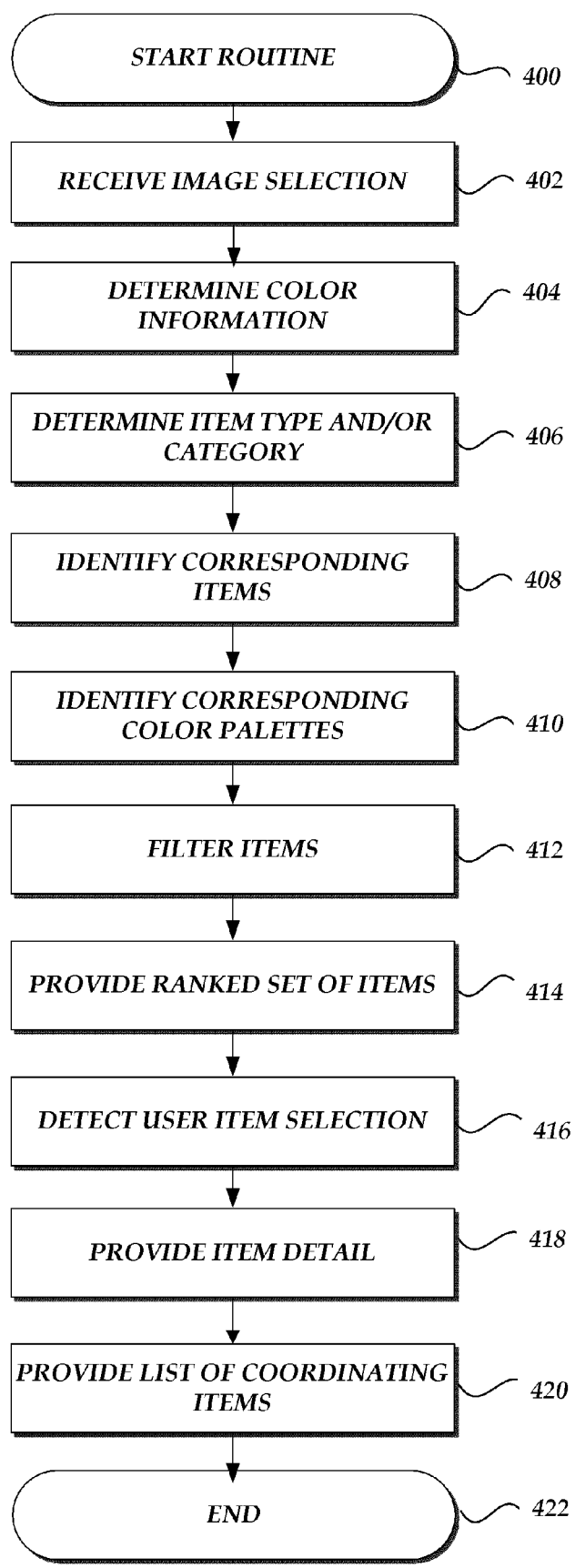
FIG. 4 is a flow diagram illustrating an embodiment of a routine implemented by the color recommendation service to provide recommendations in response to an image selection.

Example Recommendation Process to Generate Color-Related Recommendations in Response to an Image Selection FIG. 4 illustrates a flow diagram of an example routine 400 performed by color recommendation service 102 for generating a color-related recommendation at least partly in response to a user selection of an image, such as an image of an item. The color recommendation service 102 begins the routine in a block 400. At block 402, a user selection of an image (or of an item having an associated image display with text describing the item) is received by the color recommendation service 102 from a user via a user device. The selected image may have been selected from recommendations previously presented to the user, such as in response to an earlier color-related query. In association with the image selection, the user may have earlier (or after making the image selection) provided other terms or filters (e.g., entered as text, selected from a menu, or otherwise provided), such as a price range, desired brands, etc.

In some embodiments, the query may also include an indication that a user would, additionally or alternatively, like to identify items that "go with" or are otherwise associated with an originally selected image. For example, a user may not only want to identify a dress that matches a color or a color palette from an image (e.g., an image of store front window displaying current season clothing trends), but also other accessories that may not match a color from the original image, but instead have otherwise affiliated colors and thus would "go with" the dress. Such an additional request for coordinating items may be included in the original query or be provided by a user separately. Alternatively, as will be further described below, the color recommendation service 102 may automatically recommend coordinating items based at least in part on a color or colors identified in the original image.

At block 404, the color recommendation service 102 determines color information of an item in the selected image or simply from the selected image as a whole. The color information, such as a color palette, may be accessed from metadata associated with the image, which may identify a dominate color and/or other colors of the item or image, or the image may be processed to determine a dominant color of the item in the image and optionally, other item or image colors. Optionally, the color palette of the item in the image or the image as a whole may be determined in substantially real time (e.g., less than 1 second, less than 10 seconds, etc.) using a palette generation routine, such as that discussed herein with respect to FIG. 7 and elsewhere. At block 406, the color recommendation service 102 may determine an item type and/or item category from metadata associated with the image or by performing object recognition to identify the item in the image.

At block 408, the color recommendation service 102 may access the item data store 130, which may correspond to an electronic catalog of items, to identify items corresponding to the item type or category and other user specified terms or filters (e.g., price, brand, etc.). For example, item records in the item data store 130 may have tags or other metadata/keywords that identify and/or describe the respective items as similarly discussed above. By way of example, the item data store 130 may store item records for respective items in one or more electronic catalogs including item identifiers, such as described above. By way of further example, the item metadata may indicate the item type and/or category, such as "dress" and "clothing," or "blender" and "kitchen appliance."

In addition, the item metadata may include color name text or other metadata identifying one or more colors of the item or of versions of the item, such as the color names "red," "orange," "blue," etc. This color metadata may be provided by a variety of sources, such as merchandisers, vendors or others offering the item for presentation. In addition or alternatively, the color metadata may be determined dynamically or have been previously determined and stored in association with the item as a result of generating a color palette based at least in part on an evaluation of an image associated with the item, the image being further metadata optionally stored in the item data store 130 as associated with the item. For example, the color palette of an identified item having a corresponding image may be determined in substantially real time (e.g., less than 1 second, less than 10 seconds, etc.) using a palette generation routine, such as that discussed herein with respect to FIG. 7 and elsewhere. Then, color names or other color identifiers associated with colors in the color palette may be compared to the color(s) or color palette(s) determined from the image provided in the query. As a result, items having a color that is considered to match one or more colors from an image in the original query can also be identified, whether or not the item has other color metadata provided by a different source, such as a merchandiser or vendor.

The metadata may further include such information as brand. Other data, such as price, may be included as metadata or otherwise accessed. Still further, and as referenced above, a given item record may include one or more images of the item. Item record data may have been provided by an operator of a commerce network site, consumers, third party databases, and/or other sources.

The color recommendation service 102 may compare selected metadata of the selected image with item metadata or other data in the item data store 130 to identify items that are sufficiently similar to the item in the selected image to be considered as corresponding or matching. For example, one or more rules may be defined by the user and/or a system operator that specify how close an item needs to be in order to be considered a match for an item in the image. By way of illustration, a rule may specify that if an item in an image is a long-sleeved dress shirt, then only other long-sleeved dress shirts will be considered a match. By contrast, a rule may specify that if an item in an image is a long-sleeved dress shirt, then both long sleeved and short sleeved dress shirts will be considered a match. The color recommendation service 102 may store a temporary record of the matching items (e.g., by storing a list of corresponding item identifiers). The color recommendation service 102 may rank the matching items in accordance with the closeness of the match to the selected image or an item in the selected image to provide a relevancy ranking. Optionally, a user's preferences may be used in ranking matching items. By way of example, the user's preferences may be determined based on the user's purchase history (which may indicate the colors of items purchased or browsed by the user), items already in the user's wardrobe (e.g., as may be determined from the user wardrobe database 132), prior user color-related search queries, or preferences explicitly provided by the user via a preference form or otherwise. In addition or alternatively, preferences of other users or groups of users (whether selected by the user or dynamically determined by the color recommendation service 102) may be used in ranking matching items. For example, if a user "follows" or is otherwise associated with a particular fashion expert (e.g., via a social networking site), the expert's preferences may be identified and then used to rank matching items.

In an embodiment where the color recommendation service 102 has yet to perform a color analysis and/or comparison as introduced above (and thus only produced the identified items at block 408 as a result of analyzing non-color attribute information from the query), the color recommendation service 102, at block 410, identifies one or more colors or color palettes that correspond to the identified color palette of the selected image or an item depicted in the selected image. For example, the color recommendation service 102 may compare the identified color palette of one or more colors from the selected image with metadata (e.g., color names) associated with palettes to identify items having matching or relevant palettes. The identified palettes may be ranked in accordance with a determination as to how closely a given palette corresponds to the palette of the selected image. For example, palettes may have an assigned weight indicating which is the most dominant color (where a color may or may not be a shade of a color), the second most dominant color, and so on. Optionally, only palettes within a certain range of the palette of the selected image or only a specified maximum number of palettes will be identified (e.g., the 10 closest palettes). As similarly discussed above, palette weighting may also be based at least in part on one or more of the palette date, the user's gender, geographic region, ethnic group, age, palette popularity trends, etc.

At block 412, the color recommendation service 102 filters the matching items to filter out items whose color(s) or color palette(s) do not sufficiently match or correspond to the color palette of the selected image or an item in the selected image, thus generating a filtered set of items responsive to the query. For example, the color recommendation service 102 may determine from metadata associated with the matched items whether they match the palettes identified at block 410. Optionally, the color recommendation service 102 may determine from metadata associated with the matched items whether they match the colors from the color palette of the item as determined at block 404. As another option, the color recommendation service 102 may rank the filtered list according to the previously performed ranking of matching items. As a further option, the color recommendation service 102 may rank the filtered list according to the ranking of closeness of the item color palette to the selected image or an item in the selected image. As yet a further option, some combination of the ranking of matching items performed at block 408 and a ranking based on the closeness of the item color palette to the color palette of the selected image or an item in the selected image may be used to generate a further relevancy ranking of items.

In some embodiments, it will be appreciated that the processes performed by the color recommendation service 102 at blocks 410 and 412 may be considered as integral with or sub-processes of the identification of items corresponding to the item query at block 408. Accordingly, at block 408, the comparison of the query with item metadata or other data to identify items that correspond to the query may additionally include any one or more of the processes described at blocks 410 and 412. Even further, the comparison and filtering functions described in reference to blocks 408, 410, and 412 may be performed in a variety of orders in order to generate identified items responsive to the query.

At block 414, the identified set of items from block 408 or the filtered set or the ranked filtered list from block 412 is provided for display on the user device (e.g., via a browser installed on the user device, via a dedicated application such as a mobile device app, or otherwise) as recommended items based at least in part on the user's image selection in the original query. The provided set or list of items may be in the form of only images of the matching items, where the images may be retrieved from the item data store 130. The provided set or list of items may be in the form of only text identifying and/or describing the matching items, where the text may be retrieved from the item data store 130. The provided set or list of items may be in the form of both images of the matching items and corresponding text retrieved from the item data store 130. Optionally, controls may be provided to the user via which the user can indicate that a larger or a smaller number of matching items are to be presented. In response, the color recommendation service 102 may accordingly modify the number of items presented to the user. For example, if the user indicates that fewer items are to be presented to the user, the color recommendation service 102 may present the higher ranked items and not present a number of lower ranked items that had previously been presented.

At block 416, a determination is made as to whether the user has selected an item in the list of items. If the user has selected an item, an item detail page is provided, at block 418, for display on the user device. The item detail page may include detailed information regarding the item, such as one or more images, descriptive text, color name, a price, weight, size options, reviews of the item by other users or by professional reviewers, alternative similar items, and/or other information. The item detail page may also include controls via which the user can select among various versions of the item (e.g., size, color, etc.), and a purchase control via which the user can initiate purchase of the item. A control may also be provided via which the user can cause the list of matching items to be again presented to the user.

Optionally, at block 420, the color recommendation service 102 may utilize metadata associated with the item selected by the user to identify similar and/or coordinating items to the user. For example, the color recommendation service 102 may utilize color information associated with the selected item (e.g., associated with the image of the selected item), the item type information, and/or the item categorization information to identify related and/or coordinating items. For example, if the user selected a dress having a palette with black and white as the primary colors, the color recommendation service 102 may identify and present items having a similar palette with black and white as a primary colors or having other colors matching the palette of the input image and/or having a coordinating color palette (an affiliated color palette) different than colors or palettes included in the input image. By way of further example, the color recommendation service 102 may identify item accessories (e.g., a scarf, earrings, handbag, etc.) whose color(s) coordinate with the selected dress, such as may be determined by accessing the palette data store 110 to determine an ordered list of affiliated colors or otherwise dynamically determining an affiliated color palette. The color recommendation service 102 may further select a coordinating item or filter affiliated color item candidates by applying heuristics based on item taxonomy. Optionally, the color recommendation service 102 may identify item accessories or coordinating items in response to a user selection (e.g., where the user provides or selects an additional item type or item category query). In addition or alternatively, preferences of other users or groups of users (whether selected by the user or dynamically determined by the color recommendation service 102) may be used to select coordinating items. For example, if a user "follows" or is otherwise associated with a particular fashion expert (e.g., via a social networking site), the expert's preferences may be identified and then used to select or filter items identified as having one or more affiliated colors.

By way of further example, a user may want to build an outfit based on colors in an artwork image or from a picture of a designer's storefront window. The user may submit a query for finding an "outfit" together with the desired image. The color recommendation service 102 may parse the query and determine one or more color palettes that correspond to the image, such as through use of the color palette generation routine of FIG. 7, and that "outfit" is an assemblage of clothing items, optionally including accessories. Through the processes described in blocks 402-418, the color recommendation routine 102 may provide a collection of outfit items matching the color palette of the input image. Additionally or alternatively, based at least in part on the input image and thus one or more corresponding colors or color palettes, the color recommendation service 102 can determine, from the palette data store 110, an ordered list of affiliated colors (e.g., which have been determined by a community of users, through an algorithm, or otherwise to go well with the color in the query). Alternatively, one or more color palettes including affiliated colors may be determined based at least in part on the one or more input images identified in the original query. In some embodiments, such affiliated color palettes may be dynamically determined. As will be described further below, FIG. 8 illustrates a flow diagram of an example routine for generating a weighted or ordered list of affiliated colors. For more details on generating a weighted or ordered list of affiliated colors or generating a color palette using affiliated colors, see U.S. patent application Ser. No. 14/316,292, entitled "BUILDING A PALETTE OF COLORS BASED ON HUMAN COLOR PREFERENCES," filed on Jun. 26, 2014, which is incorporated by reference herein in its entirety. Continuing with the prior example, the color recommendation service 102 may then identify clothing items having one or more colors matching colors in the color palette corresponding to the input image and/or clothing items having affiliated colors to the color palette corresponding to the input image, and assemble one or more outfits accordingly. These items having one or more affiliated colors may be further processed to filter the items in accordance with other criteria, such as user preferences or preferences of one or more other users associated with a given user. Items in a given assembled outfit may be presented to the user as a set to indicate that the items in the set are part of the same recommended outfit.

As noted above, in some embodiments, coordinating items having one or more colors affiliated with the one or more colors or color palettes corresponding to the input image may be determined and provided to a user after selection of an item responsive to the original query. However, in some embodiments, the original query may also include an indication that a user would, additionally or alternatively, like to identify items that "go with" or are otherwise associated with an originally identified item and/or color(s) in the originally identified image. For example, a user may want to identify dresses that correspond to colors in a provided image and items that would "go with" these dresses. Such an additional request for coordinating items may be included in the original query or be provided by a user separately. Accordingly, in such embodiments, the color recommendation service 102 would not need to wait for user selection of an item at block 416. Alternatively, the color recommendation service 102 may automatically recommend coordinating items based at least in part on a color or colors identified in the original image without requiring a specific request for coordinating items from a user. As yet another alternative, the original query may only be for items that "go with" or are otherwise associated with an originally identified image. For example, a user may already own a red dress and may thus initiate a query providing an image of the red dress and requesting identification of items in general; or specific items or types or categories of items, such as shoes, hats, accessories or the like, that "go with" that particular red dress. In such an embodiment, the color recommendation service 102 may perform the processes described at blocks 402-418, with the exception that instead of determining and/or analyzing a matching color or color palettes with the image, an affiliated color or color palettes based at least in part on the one or more colors identified in the input image are determined and/or analyzed to provide a set of responsive items to the query. As set forth above, one example routine for generating affiliated palettes is provided in reference to FIG. 8. The color recommendation service 102 ends the routine at block 422.

Figure 5:
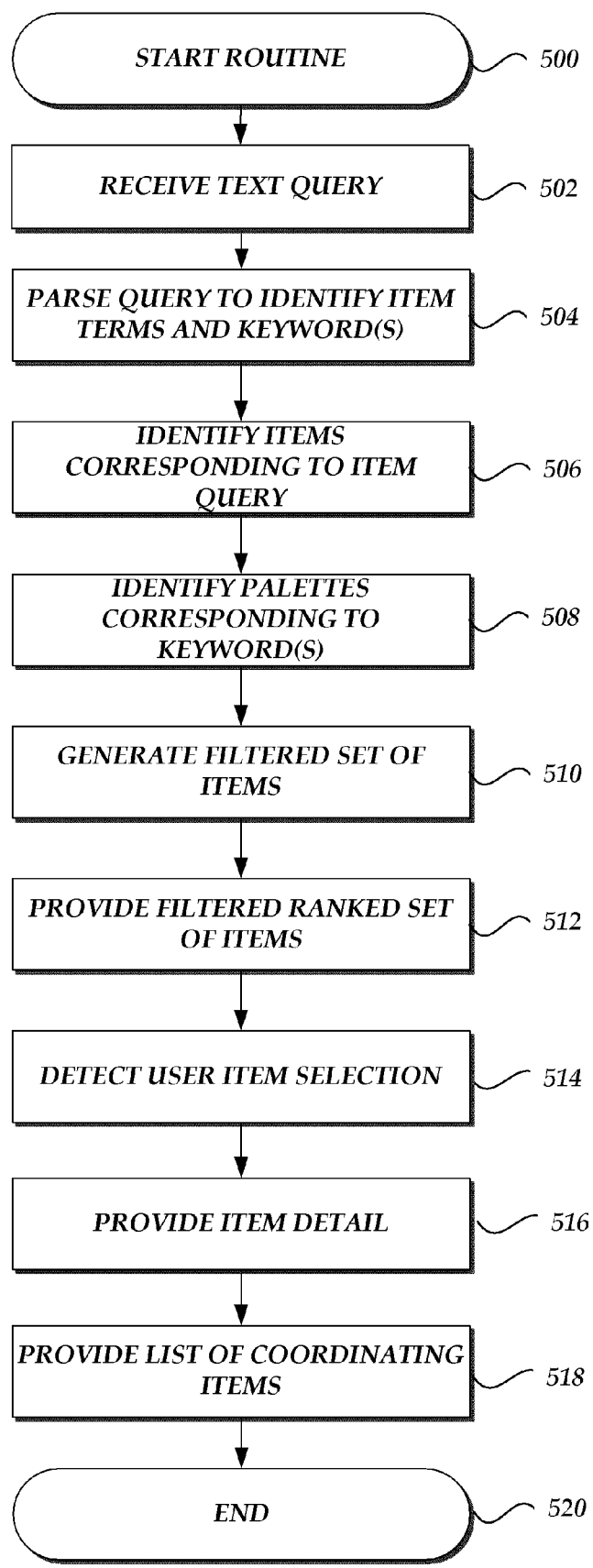
FIG. 5 is a flow diagram illustrating an embodiment of a routine implemented by the color recommendation service to provide recommendations in response to a keyword query.

Example Recommendation Process to Generate Color-Related Recommendations in Response to a Text Query Including a Keyword FIG. 5 illustrates a flow diagram of an example routine performed by color recommendation service 102 for generating a color-related recommendation at least partly in response to a query including a non-color specific keyword.

The color recommendation service begins the routine at block 500. At block 502, a text-based keyword query is received by the color recommendation service from a user via a user device. The text-based keyword query specifies a non-color keyword that may be suggestive of one or more colors (e.g., summery, sunny, mellow, dressy, holiday, Halloween, Christmas, Chanukah, sports team name (e.g., Dodgers, Seahawks, etc.) and optionally another item attribute, such as an item type or category (e.g., a dress, a top, pants, etc.). The query may also include other terms or filters (e.g., entered as text, selected from a menu, or otherwise provided), such as a price range, desired brands, etc., where the user is looking for recommendations of items corresponding to such terms or filters. Optionally, rather than or in addition to the user expressly entering a keyword, a keyword may be a keyword identified in response to a user search (e.g., the keyword can be an item identifier of an item identified in a search). In some embodiments, the query may also include an indication that a user would, additionally or alternatively, like to identify items that "go with" or are otherwise associated with an originally identified item or query. For example, a user may want to identify "summery dresses" and items that would "go with" summery dresses. Such an additional request for coordinating items may be included in the original query or be provided by a user separately. Alternatively, as will be further described below, the color recommendation service 102 may automatically recommend coordinating items based at least in part on a color or colors identified as corresponding to the original query.

At block 504, the color recommendation service 102 may parse the query to identify one or more items that correspond to one or more keywords and/or one or more other item attributes, such as an item type or category. For example, if the query is "summery dress," the color recommendation service 102 may use a dictionary of keywords and/or colors, such as dictionary data store 112, to determine that the term "summery" is a keyword and that the term "dress" is an item type. For example, the dictionary may include records of keywords. A given keyword record may indicate if the keyword corresponds to an item type (and if so, specifies the item type(s)), an item category (and if so, specifies the item category or categories), or is color-related (and if so, specifies one or more related color palettes). Optionally, one or more keywords may be automatically generated and utilized in providing recommendations (e.g., based on the current date, season, weather forecast for the day, geographic location of the user, what events are scheduled on the user's calendar, what media the user is currently viewing/listening to, to where the user is traveling, etc.). For example, if the query includes the term "formal" and the query is received in the winter, a keyword of "winter" may be automatically added to the user query (which may cause black formalwear to be recommended to the user). If, on the other hand, the query includes the term "formal" and the query is received in the summer, a keyword of "summer" may be added to the user query (which may cause white formalwear to be recommended to the user).

At block 506, the color recommendation service 102 may access the item data store 130, which may correspond to an electronic catalog of items, to identify items corresponding to the item attribute term(s). Continuing with the prior example, the identified items correspond to an item type or category and optionally other terms (e.g. price, brand, etc.). For example, item records in the item data store 130 may have tags or other metadata/keywords that identify and/or describe the respective items. By way of example, the item data store 130 may store item records for respective items in one or more electronic catalogs including item identifiers and/or other identifiers. By way of further example, the item metadata may indicate the item type and/or category, such as "dress" and "clothing," or "blender" and "kitchen appliance."

In addition, the item metadata may include text identifying one or more colors (or color palettes including one or more colors) of the item or of versions of the item, such as "red," "orange," "blue," etc. This color metadata may be provided by a variety of sources, such as merchandisers, vendors or others offering the item for presentation. In addition or alternatively, the color metadata may be determined dynamically or have been previously determined and stored in association with the item as a result of generating a color palette based at least in part on an evaluation of an image associated with the item, the image being associated with further metadata optionally stored in the item data store 130. For example, the color palette of an identified item having a corresponding image may be determined in substantially real time (e.g., less than 1 second, less than 10 seconds, etc.) using a palette generation routine, such as that discussed herein with respect to FIG. 7 and elsewhere. Then, color names or other color identifiers associated with colors in the color palette may be compared to the color identified as corresponding to a non-color keyword that is suggestive of color and is identified in and/or from the original query. As a result, in some embodiments, items with an associated image having a color that is considered to match or correspond to the query can also be identified, whether or not the item has other color metadata provided by a different source, such as a merchandiser or vendor.

The metadata may further include such information as brand. Other data, such as price, may be included as metadata or otherwise accessed. Still further, and as referenced above, a given item record may include one or more images of the item. Item record data, including images, may have been provided by an operator of a commerce network site, by consumers, third party databases, social network sites, and/or other sources.

The color recommendation service 102 may analyze and compare the query with item metadata or other data to identify items that correspond to the query. The color recommendation service 102 may store a temporary record of the matching items (e.g., by storing a list of corresponding item identifiers). The color recommendation service 102 may rank the matching items in accordance with the closeness of the match to the query to provide an item relevancy ranking. Optionally, a user's preferences, such as may be indicated by the user's purchase or browse history, items already in the user's wardrobe (e.g., as may be determined from the user wardrobe database 132), prior user color-related search queries, or preferences explicitly provided by the user via a preference form or otherwise may be used in ranking matching items. In addition or alternatively, preferences of other users or groups of users (whether selected by the user or dynamically determined by the color recommendation service 102) may be used in ranking matching items. For example, if a user "follows" or is otherwise associated with a particular fashion expert (e.g., via a social networking site), the expert's preferences may be identified and then used to rank matching items.

In an embodiment where the color recommendation service 102 has only produced the identified items at block 506 as a result of analyzing non-color attribute information, the color recommendation service 102, at block 508, identifies one or more color palettes that correspond to the identified keyword included in the query or determined automatically based at least in part on the query. For example, the color recommendation service 102 may compare the identified one or more keywords in the query with metadata associated with palettes to identify matching or relevant palettes stored in the palette data store 110, where a given palette may correspond to one or more associated keywords stored as metadata. The identified palettes may be ranked in accordance with a determination as to how closely a given palette corresponds to the keyword in the query. For example, palettes may have an assigned weight indicating which is the most dominant color (where a color may or may not be a shade of a color), the second most dominant color, and so on. Optionally, only palettes within a certain range of a set of colors corresponding to the non-color specific keyword identified in and/or determined automatically from the query or only a specified maximum number of palettes will be identified (e.g., the 10 closest palettes). Other factors may be taken into account in weighting palettes. For example, attitudes and perceptions of colors, and what colors coordinate with what other colors, may change over time, based on gender, geographic region, ethnic group, age, palette popularity trends, etc. Thus, the palette weighting may be based at least in part on one or more of the palette date, the user's gender, geographic region, ethnic group, age, palette popularity trends, etc.

By way of example, the keyword "Halloween" may be associated with orange and green palettes, which are typically associated with the Halloween holiday. By way of further example, a given sports team may be associated with palettes in the team's color(s). By way of yet further example, the keyword "formal" may be associated with palettes considered more formal, such as blacks, greys, dark blues, etc. For more example details on the generation of collections of items based on keywords and color searching based on a keyword, see U.S. patent application Ser. No. 14/315,855, entitled "AUTOMATIC COLOR PALETTE BASED RECOMMENDATIONS," filed on Jun. 26, 2014; and U.S. patent application Ser. No. 14/315,879, entitled "AUTOMATIC COLOR PALETTE BASED RECOMMENDATIONS," filed on Jun. 26, 2014; U.S. patent application Ser. No. 14/315,866, entitled "AUTOMATIC COLOR PALETTE BASED RECOMMENDATIONS," filed on Jun. 26, 2014; U.S. patent application Ser. No. 14/316,153, entitled "IDENTIFYING DATA FROM KEYWORD SEARCHES OF COLOR PALETTES," filed on Jun. 26, 2014; U.S. patent application Ser. No. 14/315,914, entitled "IDENTIFYING DATA FROM KEYWORD SEARCHES OF COLOR PALETTES," filed on Jun. 26, 2014; U.S. patent application Ser. No. 14/315,913, entitled "IDENTIFYING DATA FROM KEYWORD SEARCHES OF COLOR PALETTES," filed on Jun. 26, 2014; U.S. patent application Ser. No. 14/315,995, entitled "IDENTIFYING DATA FROM KEYWORD SEARCHES OF COLOR PALETTES," filed on Jun. 26, 2014; U.S. patent application Ser. No. 14/315,947, entitled "IDENTIFYING DATA FROM KEYWORD SEARCHES OF COLOR PALETTES," filed on Jun. 26, 2014; U.S. patent application Ser. No. 14/315,938, entitled "IDENTIFYING DATA FROM KEYWORD SEARCHES OF COLOR PALETTES," filed on Jun. 26, 2014, each of which is incorporated by reference herein in its entirety.

At block 510, the color recommendation service 102 filters the matching items to filter out items whose color(s) do not sufficiently match the keyword in the query, thus generating a filtered set of items responsive to the query. For example, the color recommendation service 102 may determine from metadata associated with the matched items whether they sufficiently match or correspond to the palettes identified at block 508. Optionally, the color recommendation service 102 may rank the filtered set of items according to the ranking of matching items performed at block 506. The color recommendation service 102 may also optionally rank the filtered set of items according to the ranking of closeness of the item color to the query. As yet another option, some combination of the ranking of matching items performed at block 506 and a ranking based on the closeness of the item color palette to the keyword suggestive of a color may be used to generate a further relevancy ranking of items.

In some embodiments, it will be appreciated that the processes performed by the color recommendation service 102 at blocks 508 and 510 may be considered as integral with or sub-processes of the identification of items corresponding to the item query at block 506. Accordingly, at block 506, the comparison of the query with item metadata or other data to identify items that correspond to the query may additionally include any one or more of the processes described at blocks 508 and 510. Even further, the comparison and filtering functions described in reference to blocks 506, 508, and 510 may be performed in a variety of orders in order to generate identified items responsive to the query.

At block 512, either the identified set of times from block 506, or the filtered set or the ranked filtered list from block 510 is provided for display on the user device (e.g., via a browser installed on the user device, via a dedicated application such as a mobile device app, or otherwise) as recommended items based at least in part on the user's query. The provided set or list of items may be in the form of only images of the matching items, where the images may be retrieved from the item data store 130. The provided set or list of items may be in the form of only text identifying and/or describing the matching items, where the text may be retrieved from the item data store 130. The provided set or list of items may be in the form of both images of the matching items and corresponding text retrieved from the item data store 130. Optionally, controls may be provided to the user via which the user can indicate that a larger or a smaller number of matching items are to be presented. In response, the color recommendation service 102 may accordingly modify the number of items presented to the user. For example, if the user indicates that fewer items are to be presented to the user, the color recommendation service 102 may present the higher ranked items and not present a number of lower ranked items that had previously been presented.

At block 514, a determination is made as to whether the user has selected an item in the list of items. If the user has selected an item, an item detail page is provided, at block 516, for display on the user device. The item detail page may include detailed information regarding the item, such as one or more images, descriptive text, a price, weight, size options, reviews of the item by other users or by professional reviewers, alternative similar items, and/or other information. The item detail page may also include controls via which the user can select among various versions of the item (e.g., size, color, etc.), and a purchase control via which the user can initiate purchase of the item. A control may also be provided via which the user can cause the list of matching items to be again presented to the user.

Optionally, and as will be further described below, the color recommendation service 102 may utilize metadata associated with the item selected by the user to identify similar and/or coordinating items to the user. For example, the color recommendation service 102 may utilize color information associated with the selected item (e.g., associated with the image of the selected item), the item type information, and/or the item categorization information to identify related and/or coordinating items. For example, if the user selected a dress having a palette with a bright shade of pink as the primary color, the color recommendation service 102 may, at block 518, identify and present items having a similar palette with bright pink as a primary color and/or having a coordinating color palette (an affiliated color palette) different than the primary color of the item. By way of further example, the color recommendation service 102 may identify item accessories (e.g., a scarf, earrings, handbag, etc.) whose color(s) coordinate with the selected dress. The color recommendation service 102 may further select a coordinating item or filter affiliated item candidates by applying heuristics based on item taxonomy. Optionally, the color recommendation service 102 may identify item accessories or coordinating items in response to a user query (e.g., where the user provides or selects an additional item type or item category query).

By way of further example, a user may want to build an outfit based on the keyword "summery." The user may submit a query "summery outfit." The color recommendation service 102 may parse the query and determine that "summery" corresponds to one or more colors or color palettes and "outfit" is an assemblage of clothing items, optionally including accessories. Based on the one or more colors or color palettes that have been determined as matching a keyword in the query (or determined automatically from the query), the color recommendation service 102 can determine, from the palette data store 110, an ordered list of affiliated colors (e.g., which have been determined by a community of users, through an algorithm, or otherwise to go well with the color(s) determined based at least in part from the query). Alternatively, one or more color palettes including affiliated colors may be determined based at least in part on the color(s) determined from the query. In some embodiments, such affiliated color palettes may be dynamically determined. As will be described further below, FIG. 8 illustrates a flow diagram of an example routine for generating a weighted or ordered list of affiliated colors. For more details on generating a weighted or ordered list of affiliated colors or generating a color palette using affiliated colors, see U.S. patent application Ser. No. 14/316,292, entitled "BUILDING A PALETTE OF COLORS BASED ON HUMAN COLOR PREFERENCES," filed on Jun. 26, 2014, which is incorporated by reference herein in its entirety. Continuing with the prior example, the color recommendation service 102 may then identify clothing items having the color(s) identified based on the query and affiliated colors, and assemble one or more outfits accordingly. Items in a given assembled outfit may be presented to the user as a set to indicate that the items in the set are part of the same recommended outfit.

As noted above, in some embodiments, coordinating items having one or more colors affiliated with the one or more colors identified as corresponding to the query may be determined and provided to a user after selection of an item responsive to the original query. However, as also noted above, in some embodiments, the original query may also include an indication that a user would, additionally or alternatively, like to identify items that "go with" or are otherwise associated with an originally identified item. For example, a user may want to identify "summery dresses" and items that would "go with" summery dresses. Such an additional request for coordinating items may be included in the original query or be provided by a user separately. Accordingly, in such embodiments, the color recommendation service 102 would not need to wait for user selection of an item at block 514. Alternatively, the color recommendation service 102 may automatically recommend coordinating items based at least in part on a color or colors identified as corresponding to the original query without requiring a specific request for coordinating items from a user. As yet another alternative, the original query may only be for items that "go with" or are otherwise associated with an originally identified item. For example, a user may already own a summery dress and may thus initiate a query for items in general; or specific items or types or categories of items, such as shoes, hats, accessories or the like, that "go with" summery dresses. In such an embodiment, the color recommendation service 102 may perform the processes described at blocks 502-516, with the exception that instead of determining and/or analyzing a matching color or color palettes, an affiliated color or color palettes based at least in part on the one or more colors corresponding to the query are determined and/or analyzed to provide a set of responsive items to the query. As set forth above, one example routine for generating affiliated palettes is provided in reference to FIG. 8. The color recommendation service 102 ends the routine at block 520.

Figure 6:
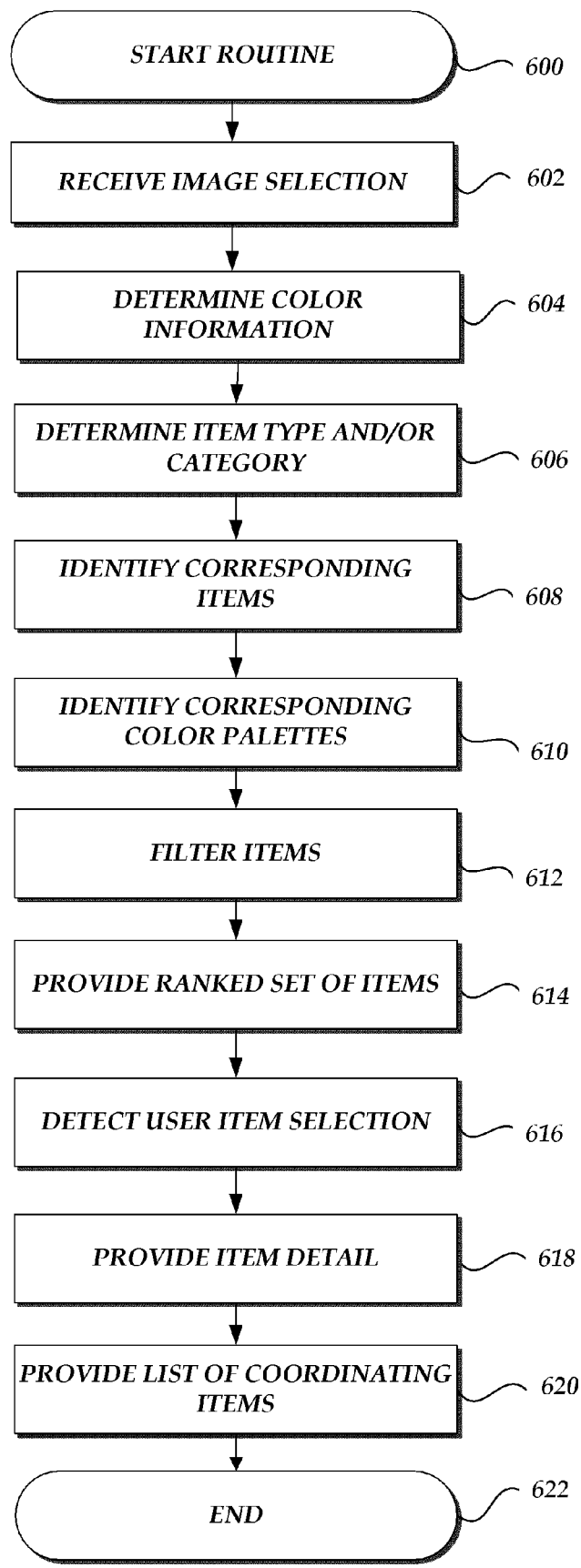
FIG. 6 is a flow diagram illustrating an embodiment of a routine implemented by a color recommendation service to provide wardrobe recommendations.

Example Recommendation Process to Generate Color-Related Wardrobe Recommendations in Response to an Image Selection FIG. 6 illustrates a flow diagram of an example routine 600 performed by color recommendation service 102 for generating a color-related wardrobe recommendation at least partly in response to a user selection of an image, such as an image of an item of clothing provided by the user. The color recommendation service 102 begins the routine at a block 600. At block 602, a user selection of an image (or of an item having an associated image display with text describing the item) is received by color recommendation service 102 from a user via a user device and may be used as a query. The selected image may have been selected from a set of images of the user's wardrobe being presented to the user, where the images may have previously been provided by the user and stored in user wardrobe data store 132. For example, the user may have taken images, e.g., photographs or videos, of clothing the user may have at home and uploaded such images for storage in the user wardrobe data store 132. Alternatively or in addition, the user may provide a keyword, such as "fiery," which is received by the color recommendation service 102. The query may also include other terms or filters (e.g., entered as text, selected from a menu, or otherwise provided), such as a price range, desired brands, etc., where the user is looking for recommendations of items corresponding to such terms or filters.

In some embodiments, the query may also include an indication that a user would, additionally or alternatively, like to identify items that "go with" or are otherwise associated with an originally selected image. For example, a user may not only want to identify a skirt that matches a color in an image of a patterned shirt the user already owns, but also other accessories that may not match a color from the original image, but instead have otherwise affiliated colors and thus "go with" the patterned shirt. Such an additional request for coordinating items may be included in the original query or be provided by a user separately. Alternatively, as will be further described below, the color recommendation service 102 may automatically recommend coordinating items based at least in part on a color or colors identified in the original image.

At block 604, the color recommendation service 102 determines color information, such as a color palette, from the selected image and/or identifies palettes corresponding to the keyword, as similarly discussed with respect to FIG. 5. The color information may be accessed from metadata associated with the image, which may identify a dominate color and/or other colors of the item, or the image may be processed to determine a dominant color of the item in the image and optionally, other item or image colors. Optionally, the color palette of the item in the image may be determined in substantially real time (e.g., less than 1 second, less than 10 seconds, etc.) using a palette generation routine, such as that discussed herein with respect to FIG. 7 and elsewhere. At block 606, the color recommendation service 102 may determine an item type and/or item category from metadata associated with the image.

At block 608, the color recommendation service 102 may access the user wardrobe data store 132 to identify items corresponding to the item type or category. For example, item records in the user wardrobe data store 130 may include metadata that identify and/or describe the respective items as similarly discussed above. By way of illustration, the user wardrobe data store 132 may store user wardrobe records for respective items in the user's wardrobe, optionally including item identifiers, such as described above. By way of further example, the item metadata may indicate the item type and/or category, such as "dress" and "clothing," or "blender" and "kitchen appliance." Still further, a given item record may include one or more images of the item provided by a user or selected by the user from a data store of images.

The color recommendation service 102 may compare selected metadata of the selected image with item metadata or other data in the user wardrobe data store 132 to identify items that correspond to the selected image or to an item in the selected image. The color recommendation service 102 may store a temporary record of the matching items (e.g., by storing a list of corresponding item identifiers). The color recommendation service 102 may rank the matching items in accordance with the closeness of the match to the selected image or an item in the selected image to provide a relevancy ranking. Optionally, in addition, a user's preferences, such as may be indicated by the user's purchase history or preferences explicitly provided by the user via a preference form or otherwise, may be used in ranking matching items.

In an embodiment where the color recommendation service 102 has yet to perform or complete a color analysis and/or comparison as introduced above (and thus only produced the identified items at block 608 as a result of analyzing non-color attribute information from the query), the color recommendation service 102, at block 610, identifies one or more color palettes that correspond to the color palette for the selected image or an item in the selected image and/or that correspond to a keyword provided by the user. For example, the color recommendation service 102 may compare the color palette corresponding to the selected image or an item in the selected image and/or colors in the query (or associated with the keyword) with metadata associated with palettes to identify matching or relevant palettes. The identified palettes may be ranked in accordance with a determination as to how well a given palette corresponds to the color palette for the selected image or an item in the selected image. For example, palettes may have an assigned weight indicating which is the most dominant color (where a color may or may not be a shade of a color), the second most dominant color, and so on. Optionally, only palettes within a certain range of the color determined from the selected image or only a specified maximum number of palettes will be identified (e.g., the 10 closest palettes).

At block 612, the color recommendation service 102 filters the matching items to filter out items whose color(s) do not sufficiently match the color(s) or color palette(s) of the selected image or an item in the selected image, thus generating a filtered set of items responsive to the query. For example, the color recommendation service 102 may determine from metadata associated with the matched items whether they match with the palettes identified at block 610.

In some embodiments, it will be appreciated that the processes performed by the color recommendation service 102 at blocks 610 and 612 may be considered as integral with or sub-processes of the identification of items corresponding to the item query at block 608. Accordingly, at block 608, the comparison of the query with item metadata or other data to identify items that correspond to the query may additionally include any one or more of the processes described at blocks 610 and 612. Even further, the comparison and filtering functions described in reference to blocks 608, 610, and 612 may be performed in a variety of orders in order to generate identified items responsive to the query.

At block 614, the identified set of items or the ranked filtered list from block 612 is provided for display on the user device (e.g., via a browser installed on the user device, via a dedicated application such as a mobile device app, or otherwise) as recommended items based at least in part on the user's image selection in the original query. The provided set or list of items may be in the form of only images of the matching items, where the images may be retrieved from the user wardrobe data store 132. The provided set or list may be in the form of only text identifying and/or describing the matching items, where the text may be retrieved from the user wardrobe data store 132. The provided set or list may be in the form of both images of the matching items and corresponding text retrieved from the user wardrobe data store 132. Optionally, controls may be provided to the user via which the user can indicate that a larger or a smaller number of matching items are to be presented. In response, the color recommendation service 102 may accordingly modify the number of items presented to the user. For example, if the user indicates that fewer items are to be presented to the user, the color recommendation service 102 may present the higher ranked items and not present a number of lower ranked items that had previously been presented. Optionally, the color recommendation service 102 may identify and provide for display to the user matching items that are not in the user's wardrobe but are available for purchase from one or more identified commerce sites.

At block 616, a determination is made as to whether the user has selected an item in the identified set or list of items. If the user has selected an item, an item detail page is provided, at block 618, for display on the user device. The item detail page may include detailed information regarding the item, such as one or more images, descriptive text, size information, fabric/material, and/or other information.

Optionally, at block 620, the color recommendation service 102 may utilize metadata associated with the item selected by the user at block 616 to identify similar and/or coordinating items to the user. For example, the color recommendation service 102 may utilize color information associated with the selected item (e.g., associated with the image of the selected item), the item type information, and/or the item categorization information to identify related and/or coordinating items. In some embodiments, the color recommendation service 102 may use a dictionary of coordinating items, such as dictionary data store 112, to identify coordinating items. By way of illustration, if the user has selected an image of a blouse, the color recommendation service 102 may access a dictionary of coordinating items that indicates that a blouse may coordinate with the following items: skirt, belt, shoes, scarf, and purse.

For example, if the user selected a black skirt to correspond with a patterned shirt, which was identified in the original image query and determined to have black as a color corresponding to the image, the color recommendation service 102 may identify and present items having a similar palette with black as a primary color, items having other colors matching a color(s) in the palette corresponding to the input image, and/or items having a color(s) in a coordinating color palette (an affiliated color palette) different at least in part from the one or more colors of the color palette corresponding to the input image. By way of further example, the color recommendation service 102 may identify (e.g., from the user's wardrobe via access to the user wardrobe data store 132) item accessories (e.g., a scarf, earrings, handbag, etc.) whose color(s) coordinate with the selected skirt and/or original image of the patterned shirt, such as may be determined by accessing the palette data store 110 to determine an ordered list of affiliated colors or otherwise dynamically determining an affiliated color palette.

In some embodiments, coordinating items having one or more colors affiliated with the one or more colors or color palettes corresponding to the input image may be determined and provided to a user after selection of an item responsive to the original query. However, in some embodiments, the original query may also include an indication that a user would, additionally or alternatively, like to identify items that "go with" or are otherwise associated with an originally identified item and/or color(s) in the originally identified image. For example, a user may want to identify a "bottom" (such as a skirt, pant, short, etc.) from her wardrobe that goes with a specifically selected shirt from her wardrobe and items that would "go with" the shirt and bottom. Such an additional request for coordinating items may be included in the original query or be provided by a user separately. Accordingly, in such embodiments, the color recommendation service 102 would not need to wait for user selection of an item at block 616. Alternatively, the color recommendation service 102 may automatically recommend coordinating items based at least in part on a color or colors identified in the original image without requiring a specific request for coordinating items from a user. As yet another alternative, the original query may only be for items that "go with" or are otherwise associated with an originally identified image. For example, a user may already own a red dress and may thus initiate a query providing an image of the red dress and requesting identification of items in general; or specific items or types or categories of items, such as shoes, hats, accessories or the like, that "go with" that particular red dress. In such an embodiment, the color recommendation service 102 may perform the processes described at blocks 602-618, with the exception that instead of determining and/or analyzing a matching color or color palettes with the image, an affiliated color or color palettes based at least in part on the one or more colors identified in the input image are determined and/or analyzed to provide a set of responsive items to the query. As set forth above, one example routine for generating affiliated palettes is provided in reference to FIG. 8. At block 622, the color recommendation service 102 ends the routine.

The foregoing routine may be similarly utilized by a merchandiser or a maintainer of an item data store in assembling sets of items, such as clothing items, from one or more catalogs of items. For example, the catalog of items may be stored in one or more catalog data stores, such as item data store 130. The merchandiser may request that a pink outfit be identified using specified different item types (e.g., blouses, skirts, shoes, handbags) or categories from the catalog data stores. The merchandiser may specify that items in affiliated colors may be included in the outfit. The color recommendation service 102 may then generate one or more recommended outfits as similarly discussed above with respect to generating outfits for a user. The merchandiser may select one or more of the presented outfits and cause a record to be stored, for later access, of the outfits including identifiers associated with each item included in a given outfit and a respective outfit name. Multiple outfits having similar attributes may be grouped as a collection. The merchandiser may then instruct that one or more of the outfits, as selected by the merchandiser, or the collection as a whole, be published on a commerce site or elsewhere to enable consumer access and purchase. The merchandiser may also instruct that one or more of the outfits, as selected by the merchandiser, or the collection as a whole, be published as on advertisement on one more sites or other advertising channels. Thus, item color information, such as color palettes and color names, may be used to organize and cluster content and items into sets, such as outfits, sets of coordinated furniture, etc.

Example Palette Generation Process

Aspects of generating a color palette based on a color image will now be described in greater detail. A color palette can be a collection of representative colors each associated with a weight or other metadata. A color palette may be generated based on palette generation criteria, which may facilitate or control a palette generation process. Illustratively, the palette generation process may include one or more of image pre-processing, color distribution generation, representative color identification, palette candidate generation, and palette determination. Representative colors with associated weight can be identified from a distribution of colors depicted by the color image, multiple palette candidates corresponding to the same color image can be generated based on various palette generation criteria, and a color palette can be identified therefrom.

In accordance with an illustrative embodiment, the image processing service 104 obtains a color image depicting one or more goods, a design, a scene, or the like, and generates one or more palettes based on palette generation criteria. The palette generation criteria can be inputted by a consumer, a host of a commerce network site, a merchandise provider or vendor, or the like. Alternatively, or in addition, the palette generation criteria can be automatically generated by a computing device or system. The palette generation criteria may indicate various preferences, factors, parameters, thresholds, or requirements that facilitate or control a palette generation process. The palette generation may optionally be based on human color preferences.

Figure 7:
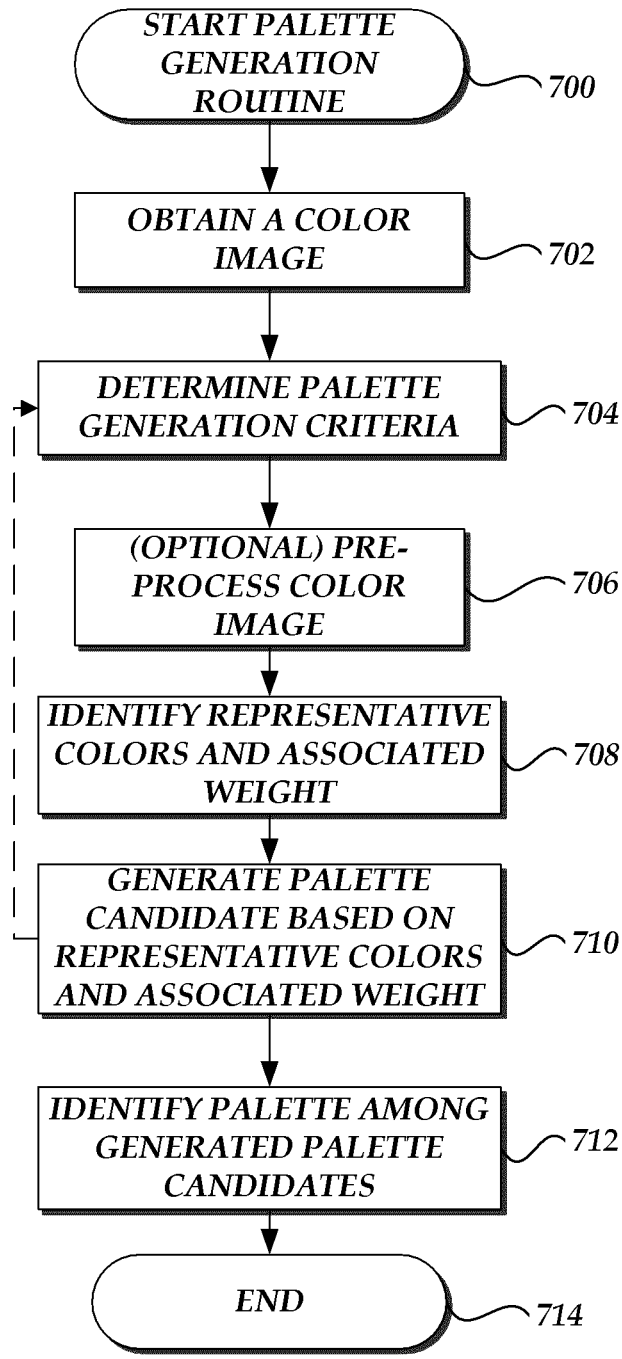
FIG. 7 is a flow diagram illustrating an embodiment of a palette generation routine implemented by the image processing service.

FIG. 7 is a flow diagram illustrating an embodiment of a palette generation routine 700 implemented by the image processing service 104. The image processing service 104 begins the routine at block 700. At block 702, the image processing service 104 obtains a color image. The color image can depict one or more items, a design, a scene, a landscape, or any other content of color. Obtaining the color image can be accomplished by receiving image data from the item data store 130, third party users 140, or other image sources, via their image data transmission to the image processing service 104. Optionally, certain images transmitted may be images designated for calibrating the image processing service 104. For example, images comprising specific scope or variance of colors may be used as the basis for a color space. In another embodiment, images transmitted may need to be manually, semi-manually, semi-automatically, or automatically assessed and filtered so as to only retain those relevant to a purpose of the palette to be generated.

Metadata associated with the color image can also be obtained. The metadata may include information corresponding to the colors (e.g., color names), color scheme, lighting source, lighting direction, or other factors regarding the color rendering of the image. The metadata may also include information about the currently obtained color image, other color images, subjects or category of subjects depicted, sources contributing to the image, or their interrelations. The metadata can further include any other information associated with the color image as can be envisioned by a person of skill in the art.

At block 704, palette generation criteria are determined. As described earlier, the palette generation criteria can be input by an image source provider or a third party user 140, who may correspond to a host of a commerce network site, a merchandise provider or vendor, a visitor to the commerce network site, a designer, an artist, an architect, or the like. Alternatively, or in addition, the palette generation criteria can be automatically generated by the image processing service 104, or another computing device or system. For example, features or patterns exhibited by the color image as well as associated metadata can be considered by an automated process to determine the palette generation criteria.

The palette generation criteria may indicate various preferences, factors, parameters, thresholds, or requirements that facilitate or control the palette generation routine performed by image processing service 104, or its subroutines. For example, the palette generation criteria may indicate a computational method for pre-processing the obtained color image, for generating a color distribution, for identifying representative colors, for generating palette-candidates, or for determining a palette. The palette generation criteria may also indicate parameters, thresholds, restraints, formula(e), or other factors that may inform various computational methods applicable to routine 700 or subroutines that it may invoke. For example, the palette generation criteria can identify a color distance formula or can include one or more thresholds of color distance for merging similar colors when representative colors are identified from a color image. For more information on how to determine a human perceptible color difference and the human color distance formula, please see U.S. patent application Ser. No. 14/316,483, entitled "IMAGE-BASED COLOR PALETTE GENERATION," filed on Jun. 26, 2014; and U.S. patent application Ser. No. 14/316,530, entitled "IMAGE-BASED COLOR PALETTE GENERATION," filed on Jun. 26, 2014; U.S. patent application Ser. No. 14/316,528, entitled "IMAGE-BASED COLOR PALETTE GENERATION," filed on Jun. 26, 2014; and U.S. patent application Ser. No. 14/316,549, entitled "IMAGE-BASED COLOR PALETTE GENERATION," filed on Jun. 26, 2014, each of which is incorporated by reference herein in its entirety.

In some embodiments, the obtained color image is pre-processed at block 706. For example, the color image may be converted to a format compatible with the palette generation routine 700 or its subroutines. The color image may also be classified or prioritized based on applicable metadata. Further, pre-processing can include noise removal, rotation, re-orientation, normalization in shape, size, resolution, or color, or other manipulations to facilitate relevant processes and methods.

Still further, pre-processing may include area marking or labeling within the color image. For example, various contour matching algorithms can be employed to mark out an area of interest. Alternatively, or in addition, areas of interest can be manually marked out. In some embodiments, a background can be removed during pre-processing through area marking or labeling. In another embodiment, one or more areas of interest can be cropped or extracted so that only these areas form the basis for palette generation. In still another embodiment, area marking or labeling may indicate colors that should be treated in a specific way, such as to be ignored, to be associated with more or less weight, to disambiguate to a greater or lesser extent. Information corresponding to pre-processing can be included in corresponding metadata that is associated with the color image, which can facilitate palette generation.

At block 708, representative colors and their associated weight are identified from the obtained color image. The identification of representative colors may include multiple subroutines or sub-elements. Various image processing or clustering algorithms can be employed to achieve this. In some embodiments, a color distribution, such as a histogram illustrating distinct colors with their corresponding weight, is generated based on the color image. The generation of color distribution can be facilitated or controlled by information included in the palette generation criteria. For example, the palette generation criteria can indicate a set of standardized colors and/or binning criteria as bases for generating the color distribution. Once the color distribution is generated, representative colors can be identified based on the color distribution, for example. The identification of representative colors can be facilitated or controlled by information included in the palette generation criteria or the metadata associated with the color image.

At block 710, a palette candidate is generated to include at least a subset of the identified representative colors and their associated weight. The palette candidate may further include metadata associated with the identified representative colors and weight.

In some embodiments, the palette generation criteria may specify or indicate criteria for determining which identified representative colors can be included in a palette candidate. For example, identified representative colors can each be associated with a weight. The palette generation criteria may indicate a threshold on the weights associated with identified colors to filter out colors that are relatively insignificant in the color image. The threshold can be dynamically generated based on a weight distribution of the identified representative colors. For example, the palette candidate can exclude identified representative colors associated with a weight lower than two standard deviations from a mean weight. Optionally, image processing service 104 can move back to block 704, where new palette generation criteria can be determined. Based on the new palette generation criteria, a new palette candidate can be generated.

At block 712, one or more palettes can be identified among previously generated palette candidate(s). In some embodiments, each generated palette candidate is automatically considered a final palette so additional identification is not required at block 712. In other embodiments, one or more palettes are identified among multiple palette candidates based on palette generation criteria that may indicate whether the identification should be performed manually or automatically, which attributes should be examined, or what standards should be applied to the identification, or the like.

Identification of palettes can be accomplished manually or semi-manually. For example, by repeating the part of routine 700 from block 704 to block 710, a third party user 140 (e.g., a consumer) may experiment with various palette generation criteria settings that can lead to generation of multiple palette candidates. In other words, each generated palette candidate can correspond to a distinct setting of palette generation criteria. The third party user 140 may then select one or more of the candidates and label them as palettes associated with the color image. Alternatively, or in addition, the identification of palettes can be accomplished automatically or semi-automatically by the image processing service 104, or by another computing device or system. For example, information associated with change of color values and associated weight across various palette candidates can be considered a function of certain settings included in palette generation criteria corresponding to the various palette candidates. Accordingly, various optimization algorithms, such as gradient methods, dynamic programming, evolutionary algorithms, combinatorial optimization, or stochastic optimization, can be utilized to pick a palette candidate(s) that achieves an optimization based on the function. Illustratively, a palette candidate can be selected if a corresponding rate of color value change is close to zero, as measured in accordance with the function.

Once identified, the one or more palettes can be stored, at the palette data store 110, either by creating new data entries or updating existing palettes. The image processing service 104 then ends the routine at block 714. Depending on relevant requirements or preferences indicated in the palette generation criteria corresponding to identified palettes, various metadata can be associated therewith, for purposes of indicating their color name, format, semantics, features, conditions, or the like. In some embodiments, metadata can link a palette to a corresponding color image from which the palette is derived. Alternatively, or in addition, metadata may indicate a category or a position in a taxonomy associated with the corresponding color image. Metadata can also indicate patterns, colocations, or other attributes of spatial distribution of palette colors within the corresponding color image.

For more example details on extracting colors from an image and building a color palette, see U.S. patent application Ser. No. 14/316,483, entitled "IMAGE-BASED COLOR PALETTE GENERATION," filed on Jun. 26, 2014; and U.S. patent application Ser. No. 14/316,292, entitled "BUILDING A PALETTE OF COLORS BASED ON HUMAN COLOR PREFERENCES," filed on Jun. 26, 2014, each of which is incorporated by reference herein in its entirety.

Example Process to Generate a List of Affiliated Colors

FIG. 8 illustrates a flow diagram of an example routine implemented by the affiliated color service 105 for generating a weighted or ordered list of affiliated colors. Affiliated color service 105 begins the routine at block 800. At block 802, the affiliated color service 105 analyzes an input color. The input color can be received from a user (e.g., a third party user 140 via data transmission to the affiliated color service 105), from another system, or generated randomly. In some embodiments, the input color can be extracted from an image, such as an image provided by a user or an image of an item in an item catalog or on a network site. For more details on extracting colors from an image, see U.S. patent application Ser. No. 14/316,483, entitled "IMAGE-BASED COLOR PALETTE GENERATION," filed on Jun. 26, 2014, which is incorporated by reference herein in its entirety.

In some embodiments, the input color is determined based at least in part on preferences, behavior, or properties of a user. A system can analyze properties of the user and determine one or more colors that the user is likely to prefer. For example, the affiliated color service 105, or other system, may have access to a user profile which includes, for example and without limitation, media preferences (e.g., preferred movies, TV shows, books, music, etc.), purchase history (e.g., items purchased in an electronic marketplace), browse history, demographics (e.g., age, gender, nationality, etc.), geographical location (e.g., where the user resides and/or previously resided), item preferences (e.g., through the use of wish lists), and the like. The affiliated color service 105 can analyze such information and determine probable colors that the user would like. One or more of these colors determined by the affiliated color service 105 can be used as the input color. As another example, the affiliated color service 105, or other system, can compare users to determine an input color. For a particular user, the affiliated color service 105 can analyze the color preferences of similar users (e.g., where similarity of users can be based at least in part on purchase history, browse history, media preferences, demographics, etc.) to determine one or more input colors that the particular user would prefer. This can be done by identifying another user with similar preferences and/or by aggregating user profile information to identify color preferences for an average user with similar preferences.

In block 802, analyzing the input color image can include determining the components of the color, such as the primary color values (e.g., RGB values), the luminance-chrominance values (e.g., YUV or YCbCr values), or the like. Analyzing the input color image can also include determining a threshold within which a color will be considered to be the same as, or sufficiently similar to, the input color. The threshold can be based on color distance according to a color distance formula. An example of such a formula is based on a human perceptible color difference. Various systems and methods for determining a human perceptible color difference and the human color distance formula are described in U.S. patent application Ser. No. 14/316,483, entitled "IMAGE-BASED COLOR PALETTE GENERATION," filed on Jun. 26, 2014; and U.S. patent application Ser. No. 14/316,530, entitled "IMAGE-BASED COLOR PALETTE GENERATION," filed on Jun. 26, 2014; U.S. patent application Ser. No. 14/316,528, entitled "IMAGE-BASED COLOR PALETTE GENERATION," filed on Jun. 26, 2014; and U.S. patent application Ser. No. 14/316,549, entitled "IMAGE-BASED COLOR PALETTE GENERATION," filed on Jun. 26, 2014, each of which is incorporated by reference herein in its entirety.

At block 804, the affiliated color service 105 identifies a plurality of color palettes that include the input color. The color palettes can be provided by the color palette providers 150. In some embodiments, one or more color palettes can be provided by the palette data store 110 where the palettes stored therein have been voted on, ranked, and/or rated. In some embodiments, the plurality of color palettes can be provided by the third party users 140.

The affiliated color service 105 determines that a palette contains the input color when that palette has at least one color that falls within the threshold color distance from the input color, as determined at block 802. In this way, palettes that include colors that are not identical to the input color, but that include colors which are sufficiently close to the input color are included in the list of palettes identified at block 804. In some embodiments, the affiliated color service 105 can use a fast color indexing routine to pull colors from the palettes, as described in U.S. patent application Ser. No. 14/315,700, entitled "FAST COLOR SEARCHING," filed on Jun. 26, 2014, which is incorporated by reference herein in its entirety.

At block 806, the affiliated color service 105 generates a list of affiliated colors. The list of affiliated colors comprises the colors from the list of palettes identified at block 804, excluding the input color and those colors that are sufficiently close to the input color. In some embodiments, the list of affiliated colors can include all the colors from the list of palettes. In certain embodiments, the list of affiliated colors is concatenated based at least in part on a threshold number of colors to include in the list, a desired or targeted color variety, color exclusion rules, or the like.

At block 808, the affiliated color service 105 assigns weights to each color in the list of affiliated colors. The affiliated color service 105 loops through each color in the list, identifies from which palette the color originated, and adjusts a weight of the color based at least in part on the ranking, rating, and/or number of votes associated with the originating palette. Adjusting the weight of the color can include increasing the weight factor by a number of votes or average rating of the originating palette. In some embodiments, adjusting the weight of the color includes scaling the ranking, rating, and/or number of votes based at least in part on a number of factors, including without limitation, which users voted on the palette, the age of the palette, the number of comments on the palette, the geographical location of the voters, and the like. In some embodiments, the ranking, rating, and/or voting of a palette is distributed among the colors within a particular palette based at least in part on color popularity, ranking of colors within a palette, or the like. In certain embodiments, each color in a palette has an individual ranking, rating, and/or number of votes where the rating can be associated with the rating of the palette or independent from the rating of the palette.

Where a color appears in more than one palette, the weight of that color can be determined at least in part by aggregating the weights from each originating palette. One aggregation method is to add the weights of each originating palette. As an example of a simple case, where a color appears in 3 palettes, the weight of that color can be equal to the sum of the votes of each of the 3 palettes. It is to be understood that other weight aggregation schemes can be used without departing from the scope of this disclosure. For example, weights can be aggregated using a weighted average of votes, an arithmetic mean of votes, or using some other algorithm (where votes can be the number of votes for a palette, the average rating of a palette, or the ranking of a palette). Weight aggregation can also be configured to account for rating of a palette or color as a function of time and/or geographical location.

The affiliated color service 105 can use a similar color distance threshold when aggregating weights for an affiliated color. For example, a color distance threshold can be used such that when the affiliated color service 105 is determining a weight for an affiliated color, it aggregates the votes from the palettes containing that affiliated color and the palettes that contain a color with a distance from the affiliated color that is less than or equal to the color distance threshold. The color distance threshold used in analyzing the input color at block 802 and the color distance threshold used in weighting affiliated colors at block 808 can be the same or different and may be based on the same or different color distance algorithms.

At block 810, the affiliated color service 105 tallies the weights of each color and provides a weighted, ordered, and/or ranked list of affiliated colors, where the rank of an affiliated color is based at least in part on the relative weight of the color. The affiliated color service 105 can concatenate the ordered list of affiliated colors based at least in part on a desired or targeted number of colors to include in the list, a threshold weight factor to include in the list, a variety of colors in the list, color exclusion rules, or the like. The affiliated color service 105 ends the routine at block 812.

Figure 9:
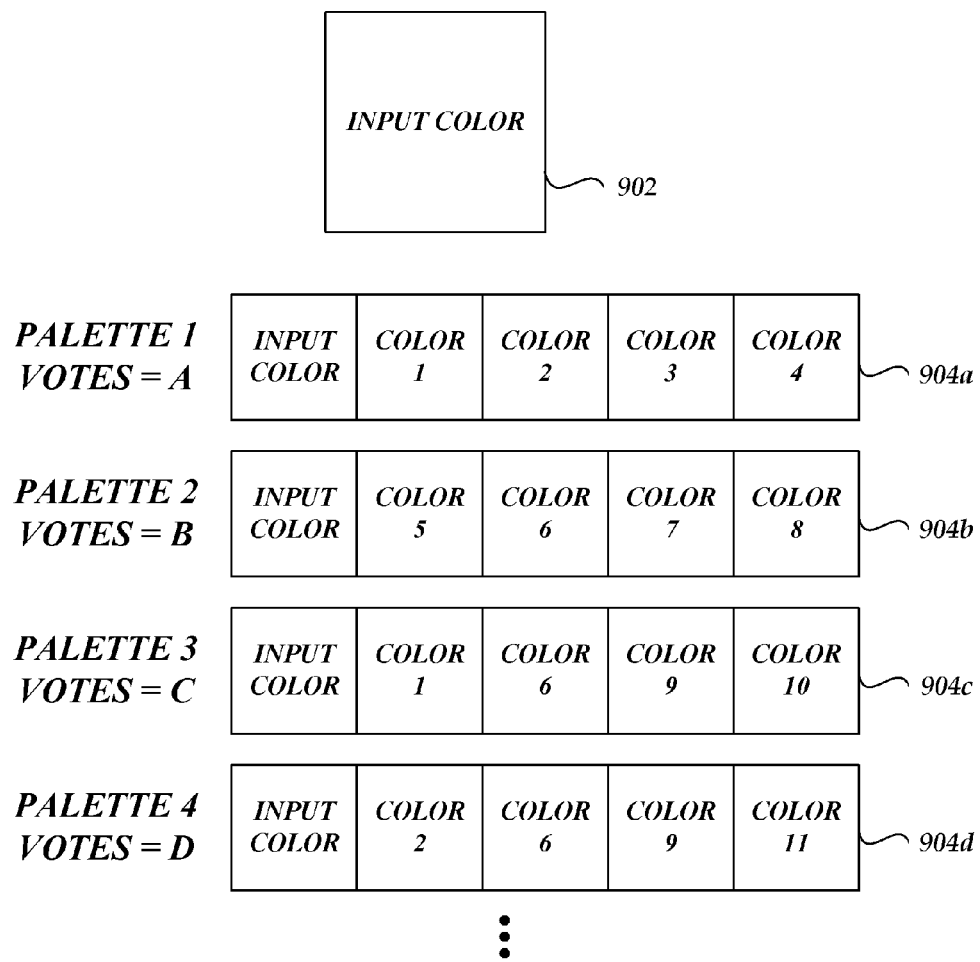
FIG. 9 illustrates an example ordered list of affiliated colors generated by the example routine of FIG. 8.

FIG. 9 illustrates an example list of affiliated colors 900 generated by the example routine of FIG. 8. Starting with the input color 902, the affiliated color service 105 identifies a number of palettes 904a-904d, each of which includes the input color or a color sufficiently similar to the input color (e.g., where the color distance between the color in the palette and the input color is less than a color distance threshold). The palettes 904a-904d can be from a data store of human- or machine-created color palettes, but which have been voted on, ranked, or rated by a community of users. As used herein, the terms votes, rating, and/or ranking are used to indicate that there is a value associated with the palette where the value is indicative of a level of human preference for the palette. Where only a single term is used (e.g., only vote, ranking, or rating), it is to be understood that the other terms could also be used. The rating of a color palette can be based on a number of votes, such as where a palette's score can be incremented by a value according to a positive vote by a user, or similarly decremented by a value according to a negative vote by a user. Similarly, the rating of a color palette can be based on a rating system where users can rate palettes on a rating scale (e.g., 0 to 5, 1 to 5, 0 to 10, −5 to 5, etc.). Likewise, the rating of a color palette can be based on users ranking palettes relative to one another.

Each time a palette is identified that contains the input color, or a color sufficiently close to the input color, each of the other colors in the palette is added to a list of affiliated colors. Each of the colors on the list of affiliated colors receives a weight which corresponds to the rating of the originating palette. For example, each of colors 1-4 in palette 1 904a is assigned a weight corresponding to the number of votes for palette 1 904a, represented by the variable A. Likewise, each of the colors in palettes 2-4 904b-904d is assigned a weight corresponding to the number of votes for each palette, represented by the variables B-D.

If a color is found in more than one palette, the weight of the color is adjusted based on the rating of each of the originating palettes. For example, color 1 is found in palette 1 and palette 3, so the weight of color 1 is based on the number of votes A+C. In some embodiments, an affiliated color is considered to be found on another palette (e.g., other than its originating palette) when the color in the other palette has a color distance that is less than a color distance threshold from the affiliated color. In some embodiments, the weighting of colors is analyzed as a function of position in a color space where the distribution of weighted colors is analyzed to determine maximums. This may be able to provide additional details about which colors are generally considered to go well with the input color, which may result in the ability to provide multiple suggestions of colors within and/or around a peak color in the color space.

In some embodiments, the list of affiliated colors is adjusted to combine colors which are close to one another based at least in part on a color distance formula. This element can be used to decrease the number of different colors where some colors are sufficiently similar to one another. This can be used to reduce the number of variations of a color, especially where the variations are insignificant, imperceptible, or otherwise lacking in value to a user.

Once the weights of each affiliated color are determined, a weighted or ordered list of affiliated colors 906 can be provided. The ordered list can include all the different colors from the palettes 904a-904d or it can contain a subset of these colors. The ordering of the list can be based at least in part on the weight of each color (e.g., higher weighted colors are ranked higher). As illustrated in the figure, the colors 1-11 are ranked according to the sum of the votes for each color, where A is greater than B which is greater than C which is greater than D. Accordingly, using an aggregation scheme based on the sum of weights, color 6 has a weight of B+C+D, color 1 has a weight of A+C, color 2 has a weight of A+D, etc.

In some embodiments, the ratings of the palettes are time-dependent. The affiliated color service 105 can use the time-dependent ratings to identify trends in color combinations and/or to identify color combinations which are relatively stable over time (e.g., classic color combinations). This can also be used to determine color combinations that were popular at a particular time.

Time-dependent ratings can also be used to predict color trends in the future. For example, the most popular colors can be tracked as a function of time, with the result plotted in a color space. The path through the color space of the most popular color (e.g., which color is the most popular color at a point in time) can be used to project what the most popular color will be at some point in the future. For example, the affiliated color service 105 can determine a directional shift of the most popular color within the color space as a function of time and project based on the directional shift. The affiliated color service 105 can then provide suggestions of color combinations based on projections of which colors will be popular at a point in time. This may be useful, for example, for visual artists to predict trends in colors and/or color combinations. It is to be understood that this projection technique can be used for the most popular color as well as the second most popular, third most popular, etc. It is also to be understood that this projection technique can be used for color palettes as well as individual colors.

In some embodiments, geographical information can be included with the ratings of the palettes (e.g., ratings of a palette can be provided as a function of location of the voting user). The affiliated color service 105 can use the geography-associated ratings to identify color combinations that are generally associated with a geographical location. For example, users within a geographical region may prefer a color combination associated with a sports team from that geographical region. The affiliated color service 105 can use information about the user (e.g., where the user is located) to suggest color combinations which utilize the geography-associated ratings of palettes.

Example Affiliated Color Palette Generation Process

Figure 10:
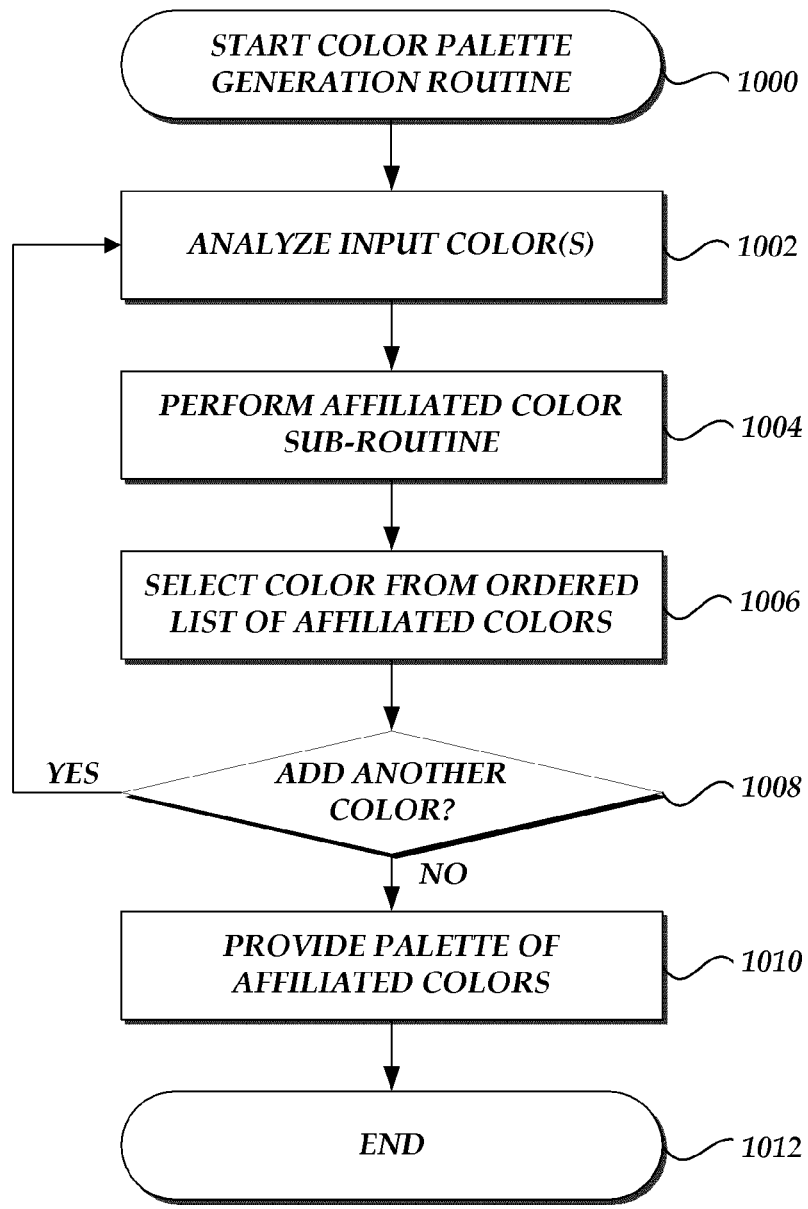
FIG. 10 is a flow diagram illustrating an embodiment of an affiliated color palette generation routine implemented by an affiliated color service.

FIG. 10 illustrates a flow diagram of an affiliated color palette generation routine implemented by an affiliated color service 105. The affiliated color service 105 begins the routine at block 1000. At block 1002, the affiliated color service 105 analyzes an input color or colors. The input color or colors can be received as described above with respect to block 802 of the routine illustrated in FIG. 8. Analysis of the input color or colors can include the functions described herein with reference to block 802 in FIG. 8. Returning to FIG. 10, in some embodiments, the routine 1000 can accept a plurality of input colors in determining a color palette, a particular example of which is described in U.S. patent application Ser. No. 14/316,292, entitled "BUILDING A PALETTE OF COLORS BASED ON HUMAN COLOR PREFERENCES," filed on Jun. 26, 2014, which is incorporated by reference herein in its entirety. In such a case, analyzing the input colors can include repeating, for each input color, the element of analyzing the input color as described with reference to block 802 in FIG. 8.

With reference to FIG. 10, at block 1004, the affiliated color service 105 performs routine 800, described herein with reference to FIG. 8. In some embodiments, the affiliated color service 105 can move to block 804 upon entering the routine of FIG. 8 because the input color or colors has been analyzed in block 802. As described, the output of the routine of FIG. 8 is a weighted or ordered list of affiliated colors. The routine of FIG. 8 can be modified to provide the ordered list of affiliated colors where there is a plurality of input colors. For example, the affiliated color service 105 can identify palettes that include one or more of the plurality of affiliated colors. In some embodiments, the affiliated color service 105 identifies palettes that include all of the input colors. In some embodiments, the affiliated color service 105 identifies palettes that include at least one of the input colors. Once the palettes are identified, the weighting of the list of affiliated colors can proceed much the same way as described herein. In some embodiments, the weighting scheme of the affiliated colors is modified based on the input colors. For example, the popularity of each of the input colors can be used to normalize or scale the weighting factors of palettes of the respective input colors.

At block 1006, the affiliated color service 105 selects a color from the ordered list of affiliated colors. The selection can be based on user input through a user interface. For example, routine 1000 can be interactive such that a user provides the affiliated color service 105 with the input color(s) and is provided the ordered list of affiliated colors generated at block 1004. The user can then select a color from the ordered list and indicate the selection to the affiliated color service 105. In some embodiments, the affiliated color service 105 selects a color from the ordered list of affiliated colors. The selection can be based at least in part on any one or more of the weighting of the affiliated color, the color distance of the affiliated color from the input color and/or other affiliated colors on the list, a selection criteria determined by a user or other system, or the like. Selection of the color from the ordered list of affiliated colors adds the color to the palette that includes the input color(s). In some embodiments, a plurality of colors can be selected.

In some embodiments, the affiliated color service 105 can select two or more colors from the ordered list of affiliated colors and provide a projection of what palettes would look like based on the selected colors. For example, the affiliated color service 105 can select the two most popular colors from the ordered list of affiliated colors (e.g., the two colors with the highest weight) and create a first tentative color palette that contains the input color(s) and the first popular color and a second tentative color palette with the input color(s) and the second popular color. The affiliated color service 105 can then provide a weighted or ordered list of affiliated colors for each of the two tentative color palettes. This can be accomplished, for example, through the routine described herein with reference to FIG. 8. This can advantageously be used to show a direction a color palette may go based on selection of a particular color for a color palette. In certain embodiments, the affiliated color service 105 can select the two or more colors based on user input, input from another system, random selection, or any combination of these.

In various embodiments, the affiliated color service 105 can recursively provide tentative color palettes to provide a variety of tentative color palettes. For example, for the two tentative color palettes described above, the affiliated color service 105 can select the two most popular colors from the ordered list of affiliated colors associated with each tentative color palette to generate a second level of tentative color palettes. This process can continue a number of times to provide the variety of tentative palettes. The affiliated color service 105 can select a different number of colors in each iteration of this routine and for each tentative palette. The affiliated color service 105 can select the two or more colors based on criteria that includes, for example and without limitation, color popularity, color variety, exclusion rules, color distance, or any combination of these.

At block 1008, the affiliated color service 105 determines whether another color will be added to the palette. If another color is to be added, routine 1000 returns to block 1002 to analyze the input colors, that now include the color selected in block 1006.

If the palette is finished (e.g., no other colors are to be added to the palette), routine 1000 proceeds to block 1010 where the affiliated color service 105 provides the palette of affiliated colors. As illustrated in FIG. 1, the provided palette of affiliated colors can be stored in palette data store 110, sent to the third party users 140, and/or sent to the color palette providers 150. The affiliated color service 105 ends the routine at block 1012.

Figure 11:
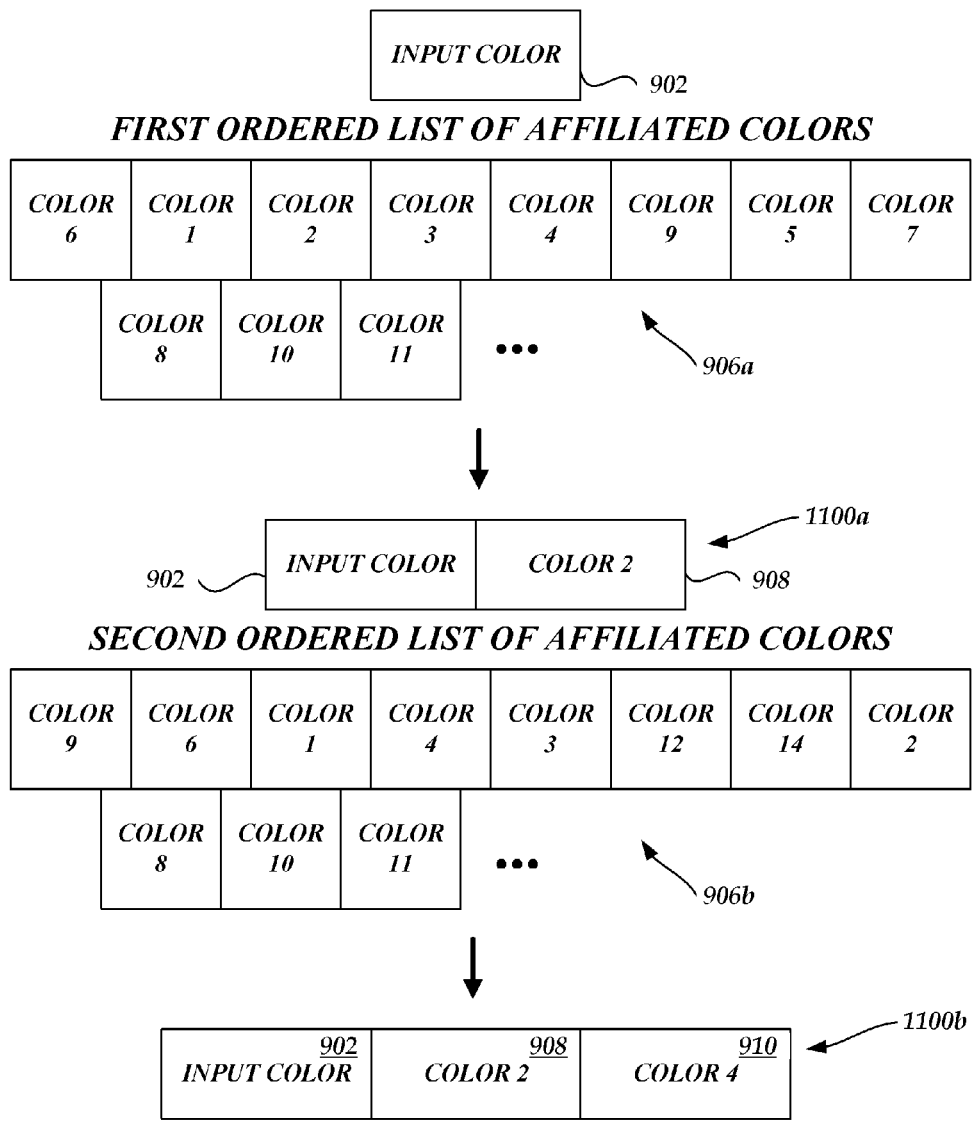
FIG. 11 illustrates example affiliated color palettes generated by the routine of FIG. 10.

FIG. 11 illustrates example affiliated color palettes 1100a and 1100b generated by the routine 1000 of FIG. 10. Starting with an input color 902, a first ordered list of affiliated colors 906a is generated, as described with reference to FIG. 9. A color can be selected from the first ordered list of affiliated colors 906a. This results in a color palette 1100a that includes the input color 902 and the selected color 908 (e.g., color 2 from the first ordered list of affiliated colors). The new color palette 1100a can then be used to generate a second ordered list of affiliated colors that now includes colors associated with the input color 902 and the selected color 908. Because new and/or different palettes have been included in the routine to determine the ordered list of affiliated colors, the order of the affiliated colors may change. In addition, the second affiliated color list 906b may include colors not present in the first ordered list of affiliated colors 906a. This process can be repeated to build up a color palette with a plurality of colors, such as color palette 1100b.

In some embodiments, as the number of input colors increases, the number of affiliated colors decreases. The affiliated color service 105, for example, may limit the identified palettes to those which include all of the input colors or a majority of the input colors. This may desirable to reduce the number of potential colors in the affiliated color list which may result in visually unappealing color combinations. In this way, the palette generation is self-limiting as the more colors in the palette the fewer affiliated colors that are presented.

By using the votes of a community of users, the generated color palettes represent a subjective color combination that may be different from what a mathematical formula may provide and that is generally preferable to users. Using human arbiters to generate color combinations can provide color palettes that mathematical algorithms may be incapable of fully determining.

The input color or colors can be determined or provided by a user, a computer system, or a combination of both. For example, a user may want to build an outfit that includes the color pink. Based on this input color, the affiliated color service 105 can provide an ordered list of affiliated colors which have been determined by a community of users to go well with the input color. As another example, a user can select the color pink as an input color and the affiliated color service 105 can be configured to select a one or more additional colors randomly or through another algorithm to provide a suggested color palette (or multiple color palettes). As another example, the user can pick an item (or a collection of items) and a color fingerprint (or a subset of it) can be used as the basis for determining affiliated colors. For an example of extracting a color fingerprint from an image of an item, see U.S. patent application Ser. No. 14/316,483, entitled "IMAGE-BASED COLOR PALETTE GENERATION," filed on Jun. 26, 2014, which is incorporated by reference herein in its entirety. Any of these color palettes could then be used to identify and/or filter potential items for the user.

For more example details on generating affiliated color palettes, see U.S. patent application Ser. No. 14/316,292, entitled "BUILDING A PALETTE OF COLORS BASED ON HUMAN COLOR PREFERENCES," filed on Jun. 26, 2014; and U.S. patent application Ser. No. 14/316,442, entitled "BUILDING A PALETTE OF COLORS FROM A PLURALITY OF COLORS BASED ON HUMAN COLOR PREFERENCES," filed on Jun. 26, 2014, each of which is incorporated by reference herein in its entirety.

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain aspects of the embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method comprising:
under control of a hardware computing device configured with specific computer-executable instructions,
receiving, from a user device, a request for a color-related recommendation, the request including an input image and one or more item attributes;
processing the input image to generate one or more affiliated color palettes based at least in part on the input image, wherein an affiliated color palette is a color palette having a first color corresponding to a color in a color palette for the input image and one or more additional colors not in the color palette for the input image, the one or more additional colors determined based at least in part on:
the one or more additional colors being included in other color palettes having the first color; and
a respective rating for each of the other color palettes;
identifying, using information obtained from an electronic item data store, a plurality of items corresponding to the one or more affiliated color palettes and the one or more item attributes;
generating a ranking for the identified plurality of items; and
generating for display on the user device, in accordance with the generated ranking, an item recommendation for each item of at least a portion of the identified plurality of items, each recommendation comprising an image for the item.

2. The computer-implemented method of claim 1, wherein the color palette for the input image is determined from metadata associated with the input image.

3. The computer-implemented method of claim 1, wherein the color palette for the input image is determined by identifying a plurality of representative colors and associated weights from a color distribution corresponding to the input image.

4. The computer-implemented method of claim 1, wherein the rating is a number of votes or corresponds to a weight associated with the number of votes.

5. The computer-implemented method of claim 1, wherein the electronic item data store includes images of items from an electronic catalog of items being offered for sale via a networked commerce system.

6. A system comprising:
a data store configured to at least store computer-executable instructions; and
a hardware processor in communication with the data store, the hardware processor configured to execute the computer-executable instructions to at least:
receive a request for a color-related recommendation, the request including an input image and an item attribute;
process the input image to generate an affiliated color palette based at least in part on the input image, wherein the affiliated color palette is a color palette having a first color within a color range of a color in a color palette for the input image and an additional color outside a color range of any individual color identified in the color palette for the input image, the additional color determined based at least in part on the additional color being included in other color palettes having the color in the color palette for the input image;

identify one or more items corresponding to the affiliated color palette and the item attribute; and generate an item recommendation for at least a portion of the identified one or more items, each item recommendation including an image for the item.

7. The system of claim 6, wherein the hardware processor is further configured to execute the computer-executable instructions to at least:

generate a ranking for the identified one or more items; and provide the generated item recommendations for display in accordance with the generated ranking for the identified one or more items.

8. The system of claim 6, wherein the color palette for the input image is determined from the input image by selecting a palette color from a plurality of representative colors identified from the input image.

9. The system of claim 8, wherein the plurality of representative colors are identified by selecting a subset of colors from a set of colors depicted by the input image based at least in part on a color distance associated with the subset of colors.

10. The system of claim 9, wherein the plurality of representative colors are further identified by merging individual colors of the selected subset of colors with similar colors in the set of colors depicted by the input image, respectively.

11. The system of claim 8, wherein individual representative colors of the plurality of representative colors are identified by determining a dominance of the individual representative color among a plurality of colors depicted by the input image.

12. The system of claim 6, wherein the one or more items corresponding to the affiliated color palette are identified from electronic images of items from a user's wardrobe.

13. The system of claim 6, wherein the one or more items corresponding to the affiliated color palette are identified from an electronic catalog of items.

14. The system of claim 7, wherein the ranking is generated based at least in part on at least one of a calendar date, a season, a weather forecast, a geographic location associated with a user, or an event scheduled on a calendar of a user.

15. A non-transitory computer-readable storage medium storing computer-executable instructions that when executed by a processor perform operations comprising:

processing the input image to generate an affiliated color palette based at least in part on an image, wherein the affiliated color palette is a color palette having a first color within a color range of a color in a color palette for the image and an additional color outside a color range of any individual color identified in the color palette for the input image, the additional color determined based at least in part on the additional color being included in other color palettes having the color in the color palette for the input image;

identifying a plurality of items corresponding to the affiliated color palette and an item attribute;

generating a ranking for the identified plurality of items; and generating an item recommendation for each item of at least a portion of the identified plurality of items, each item recommendation including an image for the item, the item recommendations associated with the generated ranking.

16. The non-transitory computer-readable storage medium of claim 15, wherein the color palette corresponding to the image is determined from metadata associated with the image.

17. The non-transitory computer-readable storage medium of claim 15, wherein the color palette for the image is determined by identifying a plurality of representative colors and associated weights from a color distribution corresponding to the image.

18. The non-transitory computer-readable storage medium of claim 17, wherein the color palette for the image is generated in less than 10 seconds.

19. The non-transitory computer-readable storage medium of claim 15, wherein the plurality of items corresponding to the affiliated color palette are identified from electronic images of items from a user's wardrobe.

20. The non-transitory computer-readable storage medium of claim 15, wherein the plurality of items corresponding to the affiliated color palette are identified from an electronic catalog of items.

21. The non-transitory computer-readable storage medium of claim 15, wherein the ranking is generated based at least in part on at least one of a calendar date, a season, a weather forecast, a geographic location associated with a user, or an event scheduled on a calendar of a user.

* * * * *